US012378796B1

(12) United States Patent
Spittle

(10) Patent No.: US 12,378,796 B1
(45) Date of Patent: Aug. 5, 2025

(54) ELECTRONIC LOCK WITH SERVICE SUBSCRIPTION

(71) Applicant: Oliver Anthony Spittle, Davis, CA (US)

(72) Inventor: Oliver Anthony Spittle, Davis, CA (US)

( * ) Notice: Subject to any disclaimer, the term of this patent is extended or adjusted under 35 U.S.C. 154(b) by 251 days.

(21) Appl. No.: 17/988,729

(22) Filed: Nov. 16, 2022

Related U.S. Application Data

(60) Provisional application No. 63/281,953, filed on Nov. 22, 2021.

(51) Int. Cl.
*E05B 47/00* (2006.01)
*E05B 71/00* (2006.01)

(52) U.S. Cl.
CPC .......... *E05B 47/0001* (2013.01); *E05B 71/00* (2013.01)

(58) Field of Classification Search
CPC .............................. E05B 47/0001; E05B 71/00
See application file for complete search history.

(56) References Cited

U.S. PATENT DOCUMENTS 5,408,212 A * 4/1995 Meyers ................. E05B 45/005 340/432
5,836,002 A * 11/1998 Morstein .................. B62H 5/20 340/432
6,243,005 B1 * 6/2001 Haimovich ........... G09F 3/0394 340/432
6,408,660 B1 * 6/2002 Lai ........................ G09F 3/0352 40/6
7,104,091 B2 * 9/2006 Kuhblank .............. B62H 5/003 340/432
7,631,524 B2 * 12/2009 Araujo .................... E05B 67/06 70/52
7,661,280 B1 * 2/2010 Weyland ................ B62H 5/003 70/30
8,528,371 B2 * 9/2013 Spiegel ................. E05B 67/003 70/65
2009/0301145 A1 * 12/2009 Valerio ................. E05B 35/105 70/53
2013/0264128 A1 * 10/2013 Plato ....................... E05B 39/00 70/21
2018/0230713 A1 * 8/2018 Sidhu .................... E05B 67/003
2020/0361552 A1 * 11/2020 Radenbaugh .......... B62H 5/147
2021/0189770 A1 * 6/2021 Evarts ..................... E05B 73/00

* cited by examiner

*Primary Examiner* — Mark A Williams
(74) *Attorney, Agent, or Firm* — Kevin J Fournier Intellectual Property Legal Services Ltd.; Kevin J Fournier

(57) ABSTRACT

A locking device for locking an object to an item, such as a structure or other object, may have a hub, a first loop configured to pass around at least part of the object, and a second loop configured to pass around at least part of the item. The locking device may further have a first locking mechanism that is movable between a first locked configuration in which a first end of the first loop is secured to the hub, and a first unlocked configuration in which the first end is not secured to the hub. The locking device may further have a second locking mechanism that is movable between a second locked configuration in which a second end of the second loop is secured to the hub, and a second unlocked configuration in which the second end is not secured to the hub.

19 Claims, 28 Drawing Sheets

ELECTRONIC LOCK WITH SERVICE SUBSCRIPTION

RELATED APPLICATIONS

This application claims the benefit of U.S. Provisional Application Ser. No. 63/281,953, filed on Nov. 22, 2021 and entitled "Electronic Lock with Service Subscription," which is incorporated as though set forth herein in its entirety.

TECHNICAL FIELD

The present document relates to systems and methods for locking objects such as bicycles.

BACKGROUND

There are many situations in which it is desirable for a user to securely attach an object to a structure, or an object to another object. One example is when a person wishes to lock their bicycle to a bicycle rack or post. This typically requires that the person has purchased and carries with them a bicycle lock. In many situations this is a padlock with a chain or cable used for attaching the bicycle to the rack or post.

There are many drawbacks to the use of conventional locks. For example, the user may not wish to purchase a lock, or may not always be able to carry the lock with them. Further, the user may not have time to lock their object onto a structure, or may be unable to effectively lock the object to a particular structure due to the physical limitations of the lock. Further, a low-cost lock may be easily damaged or broken, particularly by an individual attempting to steal the object. Yet further, the user may be unable to locate a suitable structure on which to lock their object, or may find that the desired structure is already filled to capacity with other locked objects.

SUMMARY

The present disclosure describes locking devices for locking an object to an item such as a structure or another object. The locking devices described herein may have a hub connected to two independently lockable loops, each of which may have its own locking mechanism. The loops may include one for a user of the locking system and one for a master of the locking system, and may be referred to as a user loop and a master loop, respectively. The master may attach the master loop to an item such as an existing structure; examples include a bicycle rack, post, or railing. These structures may include designated locking locations. Once the master loop is deployed, the user may take their object (for example, a bicycle) to the designated locking location, unlock the user loop, attach their bicycle, and then re-lock the user loop.

The locking devices disclosed herein may adopt a simple design and/or provide an easy-to use interface that can be keyless, trackable, highly secure, and/or easily deployable. The locking devices described herein may allow a user to easily locate the lock, determine whether designated locking locations are in use, and/or reserve locking locations through a mobile application. Optionally, the locking devices may be universal; i.e., they may be capable of being applied to any of a wide variety of existing items (such as structures) without any modifications being made to the locking device, the item, or the object being locked to the item. Other locks and cables may be combined with the locking systems disclosed herein.

According to some embodiments, a locking device for locking an object to an item may have a hub, a first loop configured to pass around at least part of the object, and a second loop configured to pass around at least part of the item. The locking device may further have a first locking mechanism that is movable between a first locked configuration in which a first end of the first loop is secured to the hub, and a first unlocked configuration in which the first end is not secured to the hub. The locking device may further have a second locking mechanism that is movable between a second locked configuration in which a second end of the second loop is secured to the hub, and a second unlocked configuration in which the second end is not secured to the hub.

The hub may have a first component that houses the first locking mechanism, and a second component that houses the second locking mechanism. The first component and the second component may be rotatable relative to each other. In at least one embodiment, the first and second locking mechanisms can also be spring-loaded for ease of use (similar to a padlock design).

The first loop may further have a first loop second end that is locked to the hub in the first locked configuration and unlocked from the hub in the first unlocked configuration.

The first loop may further have a first loop second end that is polyaxially rotatably coupled to the hub.

The locking device may further have a theft detection mechanism that detects whether the first loop is damaged.

The first locking mechanism may have a biasing element that biases the first locking mechanism to the first locked configuration.

The first locking mechanism may have a mechanical input that can be actuated by a user to move the first locking mechanism from the first locked configuration to the first unlocked configuration.

The first locking mechanism may further have a pin that slides or rotates to engage the first end of the first loop in the first locked configuration, and to disengage from the first end of the first loop in the first unlocked configuration.

The locking device may further include a controller, and an electrically operated actuator controlled by the controller such that the electrically operated actuator is operable to help move the first locking mechanism between the first locked configuration and the first unlocked configuration.

The first locking mechanism may further have a block that is movable by the electrically operated actuator between a locked position in which the block interferes with user actuation of the mechanical input and an unlocked position in which the block does not interfere with user actuation of the mechanical input.

The first locking mechanism may further have a key operated lock configured to move the block to the unlocked position without requiring actuation of the electrically operated actuator.

The locking device may further have a controller configured to perform at least one action selected from the group consisting of initiating motion of the first locking mechanism to the first locked configuration, initiating motion of the first locking mechanism to the first unlocked configuration, enabling motion of the first locking mechanism to the first locked configuration, enabling motion of the first locking mechanism to the first unlocked configuration, identifying a user attempting to use the locking device, and indicating a status of the locking device.

The controller may be configured to take the action in response to receipt of communication from a mobile device operated by a user.

According to some embodiments, a locking device for locking an object to an item may have a hub securable to an item, a first loop configured to pass around at least part of the object, and a first locking mechanism configured to be actuated between a first locked configuration in which a first end of the first loop is secured to the hub, and a first unlocked configuration in which the first end is not secured to the hub. The first locking mechanism may have a block that is movable between a locked position and an unlocked position, and a mechanical input configured such that, with the block in the unlocked position, the mechanical input can be actuated by a user to move the first locking mechanism from the first locked configuration to the first unlocked configuration, and with the block in the locked position, the mechanical input cannot be actuated by a user to move the first locking mechanism from the first locked configuration to the first unlocked configuration.

The locking device may further have a second loop configured to pass around at least part of the item, and a second locking mechanism that is movable between a second locked configuration in which a second end of the second loop is secured to the hub, and a second unlocked configuration in which the second end is not secured to the hub.

The locking device may further have a controller and an electrically operated actuator controlled by the controller such that the electrically operated actuator is operable to move the block between the locked position and the unlocked position.

The locking device may further have a controller configured to perform at least one action selected from the group consisting of initiating motion of the second locking mechanism to the second locked configuration, initiating motion of the second locking mechanism to the second unlocked configuration, enabling motion of the second locking mechanism to the second locked configuration, and enabling motion of the second locking mechanism to the first unlocked configuration.

The controller may be configured to take the action in response to receipt of communication from a mobile device operated by a user.

According to some embodiments, a locking device for locking an object to an item may have a hub, a first loop configured to pass around at least part of one of the object and the item, a second loop configured to pass around at least part of the other of the object and the item, a first locking mechanism that is movable between a first locked configuration in which a first locking portion of the first loop is secured to the hub, and a first unlocked configuration in which the first locking portion is not secured to the hub. The locking device may further have a second locking mechanism that is movable between a second locked configuration in which a second locking portion of the second loop is secured to the hub, and a second unlocked configuration in which the second locking portion is not secured to the hub. The first locking mechanism may have a block that is movable between a locked position and an unlocked position, and a mechanical input configured such that, with the block in the unlocked position, the mechanical input can be actuated by a user to move the first locking mechanism from the first locked configuration to the first unlocked configuration, and with the block in the locked position, the mechanical input cannot be actuated by a user to move the first locking mechanism from the first locked configuration to the first unlocked configuration.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

The locking devices described herein may be used to facilitate locking of various objects, such as bicycles, motorbikes, scooters, hoverboards, and the like to other objects, or to structures such as bike racks, lamp posts, columns, and the like. Such locking devices may provide flexibility in placement for the "master" or administrator of the locking device, and/or flexibility in use for the user wishing to lock an object with the locking device. In some embodiments, locking to the object and locking to the structure or other object may be carried out independently. Various electronic locking, unlocking, charging, reservation, and/or notification systems may be used.

Figure 1:
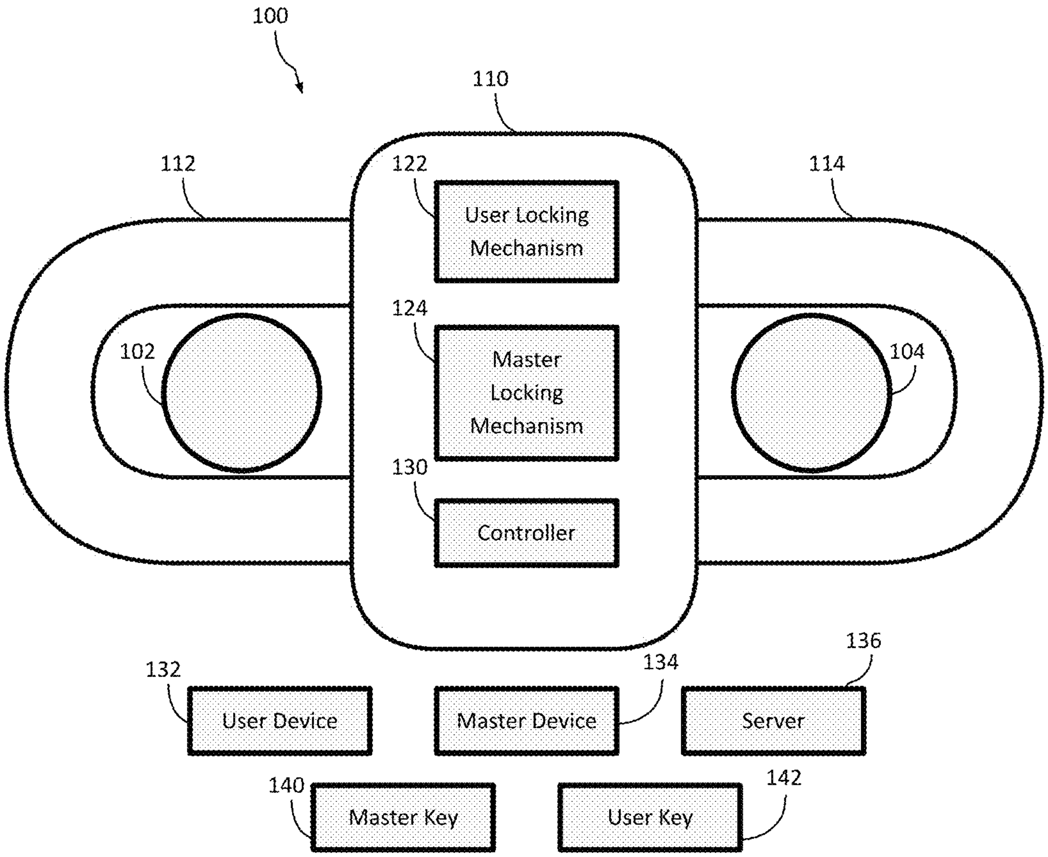
FIG. 1 is a top view of a locking device according to one embodiment.

FIG. 1 is a top view of a locking device 100 according to one embodiment. The locking device 100 may be designed to secure an object 102 to an item 104, which may be for example a structure or another object. The locking device 100 may be lockable to the object 102 and the item 104 independently of each other so that the locking device 100 can be selectively locked to either one, or to both or neither. In FIG. 1, the object 102 and the item 104 are both illustrated as circles merely by way of example; the circles represent bars, posts, or elements that can be at least partially captured, and thus securely retained, by the locking device 100.

The locking device 100 may have a hub 110, user loop 112, and a master loop 114. The user loop 112 may be usable to secure the locking device 100 to the object 102, and the master loop 114 may be usable to secure the locking device 100 to the item 104 (or other object). Notably, in this application, a "loop" does not necessarily refer to a fully-bounded, closed loop, but rather to any shape that can, in combination with a hub, encircle at least part of the object 102 or the item 104 to restrict removal of the locking device 100 from the object 102 or the item 104. A "loop" may be rigid or flexible, and may be securable to a hub at either or both ends. A flexible loop may include any known lock elements, such as a chain or wire cable. In some embodiments, a "loop" may be similar to the "U" portion of a "D lock" as known in the art.

The locking device 100 may further have a user locking mechanism 122 configured to selectively lock the user loop 112 to the hub 110 to secure the object 102 to the hub 110, and to selectively unlock the user loop 112 from the hub 110 to release the object 102 from the hub 110. Similarly, the locking device 100 may have a master locking mechanism 124 configured to selectively lock the master loop 114 to the hub 110 to secure the hub 110 to the item 104, and to selectively unlock the master loop 114 from the hub 110 to release the hub 110 from the item 104.

The locking device 100 may further have a controller 130 that electronically controls various aspects of the operation of the locking device 100. The controller 130 may include various hardware and/or software components as known in the art, including a power supply, a processor, memory, a data store, a network interface, an input device, an output device, and/or any other electronic components known in the fields of electrical and computing devices.

In some embodiments, the controller 130 may control locking and/or unlocking of the user locking mechanism 122 and/or the master locking mechanism 124. However, the controller 130 is optional and may, in some embodiments, be omitted in favor of direct user actuation of the user locking mechanism 122 and/or the master locking mechanism 124, driven by user action. In other embodiments, the user locking mechanism 122 and/or the master locking mechanism 124 may be actuated by either externally via user actuation, or electronically via the controller 130. Various functions of the controller 130 will be set forth subsequently.

The locking device 100 may be designed to communicate with various other components via the controller 130 to facilitate locking, unlocking, reservation, diagnostics, and/or other activities. For example, the locking device 100 may communicate with a user device 132 operated by a user, such as a computer, mobile phone, wearable device, and/or the like. The locking device 100 may further communicate with a master device 134 operated by a master (for example, an individual, company, or government agency that controls the operation of the locking device 100), which may also be a computer, mobile phone, wearable device, and/or the like. Communication with the user device 132 and/or the master device 134 may be direct and/or may occur via a server 136, and may take place via any suitable wired or wireless communication method. In some embodiments, the master may host the server 136, which may store data regarding the operation of more than one locking device 100, such as reservation data, operational data, payment data, user data, and/or the like.

Master Key

As further shown in FIG. 1, the locking device 100 may include a master key 140 that unlocks the master loop 114 of the locking device 100 of FIG. 1, and possibly other locking devices as well. This may allow the master (or administrator) to quickly and easily unlock or lock multiple locks.

In some embodiments, the master key 140 may be a smart key. When inserted into the locking device 100 (for example, in a receptacle formed in the hub 110, with a receiving interface in communication with the controller 130), the information on the smart key may be read and the master may be able to unlock the master loop 114. Non-limiting examples of smart keys include a USB drive, a biometric reader, a computer, and a smart device such as a smartphone running an app.

The controller 130 of the locking device 100 may allow the hub 110 to be unlocked with a remote device, such as the master device 134. Such unlocking may be carried out, for example, via Bluetooth, Near Field Communication, Ultra-wideband (UWB), Wi-Fi, cellular communication, and/or the like. In some instances, the hub 110 may use existing Near Field Communication and/or BLE (Bluetooth Low Energy) wireless protocols for ultra-low energy secure packet data transfer for activating the locking device 100, authenticating a user, locking the master loop 114, and/or unlocking the master loop 114.

The master may use a mobile application operating on the master device 134 (signed into their master account) in order to send a signal to the controller 130 via a standard wireless communications protocol such as Near Field Communication, Bluetooth Low Energy, UWB, or similar, and unlock the master loop 114. This may further enhance the security of the locking device 100 with the use of multi-factor authentication, such as biometric measurements, for the creation of and the use of the electronic master key 140.

The master key 140 may include a manual handle to twist or pull the master locking mechanism 124 in order to unlock the master loop 114. The master key 140 may be a combination of several different types of keys, with one being a main key, and the others being backups. Further, the master key 140 may be a metal key or a company single sign-on (SSO) login. The master key 140 may perform face identification, voice identification, fingerprint identification, DNA identification, and/or any other type of biometric identity verification.

The master key 140 may include a combination lock, a physical keypad, e.g., for entering an alphanumeric code, and/or an electronic keypad, e.g., for entering an alphanumeric code on a mobile/smart device or computer.

The master key 140 may communicate with a user via any known method, including but not limited to text messages, email, a mobile application, etc. A password and/or answer to a security question may be required to operate the master key 140.

User Key

The locking device 100 may include a user key 142 that unlocks one or more user loops 112. The user key 142 may prevent outside interference from other users that are using similar unlocking devices. The user key 142 may be particularly useful when the master has pre-allocated several locks for different individuals to use.

Policy-driven access may allow the master to control who has access to the locking device 100. An example of this is a facility that sets access rights for a locking device that only certain authenticated personnel have. All transactions and accesses may be monitored and sent to the cloud for a facility manager to oversee.

In some instances, the user key 142 is a smart key. The smart key may contain information pertinent to that user and/or may serve to identify the user. Non-limiting examples of smart keys include a USB drive, a biometric reader, a computer, and a smart device such as a smartphone running an app. When inserted into the locking device 100 (for example, into a receptacle on the hub 110, the information on the smart key may be read and may allow the user to be able to unlock the user loop 112.

Use of the user key 142 may thus add a second layer of security, as the master may include certain clearances on certain keys so that only specific users may unlock specific locks. This may also be useful for a scenario in which there is a large number of locking devices.

The controller 130 of the locking device 100 may allow the locking device 100 to be unlocked with a remote device, such as the user device 132. Any communications protocol may be used, including but not limited to Bluetooth, Near Field Communication, and the like. In some instances, locking devices may use existing Near Field Communication and/or BLE wireless protocols for ultra low energy secure packet data transfer for activating the locking device 100, authenticating the user, locking the user loop 112, and/or unlocking the user loop 112.

The user may use a mobile application (which may require that the user log into their user account) on the user device 132 in order to send a signal to the controller 130 via a standard wireless communications protocol such as Near Field Communication, Bluetooth Low Energy, or similar, and unlock the user loop 112 of the locking device 100 they wish to use. Use of the user key 142 may thus help to extend security further. Multi-factor authentication may optionally be used.

The user key 142 may have a manual handle to twist or pull the user locking mechanism 122 in order to unlock the locking device 100. The user key may be a combination of several different types of keys, with one being a main key, and the others being backup methods. The user key 142 may be a physical key and/or a digital key such as may be accessible via company SSO login.

The user key 142 may perform face identification, voice identification, fingerprint identification, DNA identification, and/or any other known biometric identification method.

The user key 142 may include a combination lock, a physical keypad, e.g., for entering an alphanumeric code, and/or an electronic keypad, e.g., for entering an alphanumeric code on a mobile/smart device or computer.

The user key 142 may communicate with a user via any known method, including but not limited to text messages, email, and/or a mobile application. A password and/or answer to a security question may be required to operate the user key 142.

Controller

In some instances, the controller 130 of the locking device 100 may include a power supply such as a battery. In some instances, the controller 130 may have a reserve/backup battery. The controller 130 may have a display, which may provide notifications to the user, including but not limited to the battery level, whether the locking device 100 is out of order, whether service or maintenance is required, whether the locking device 100 is in use, and/or other information.

In some instances, the controller 130 may include one or more lights (e.g., LED lights), which may be mounted in the hub 110 and/or otherwise positioned where they can be seen by the user. The brightness and/or color of the lights may indicate the battery level, whether the locking device 100 is out of order, whether service/maintenance is required, whether the locking device 100 is in use, and/or other information. In some instances, lights may be placed on the user loop 112, master loop 114, and/or hub 110 to facilitate identification, indicate status, and/or facilitate use of the locking device 100 in dark environments.

In some instances, the aforementioned lights may be activated by motion sensors. In some instances, the controller 130 includes a system for generating a current through the user loop 112 and/or master loop 114.

In some instances, the locking device 100 may have a digital clock, a GPS, and/or a camera. Additionally or alternatively, cameras may be installed proximate to where the locking device 100 is installed, to enabling remote visual monitoring of the locking device 100.

In some instances, the locking device 100 may include wireless charging electronics to keep the battery charged. The wireless charging electronics can be activated by a remote charging device that supplies a charge to the device based on its location. The charging station may be located proximate to the locking device 100. The charging station may be activated at night, for example, when the locking device 100 is not in use, in order to charge it so that it is ready for use in the morning.

In some instances, the controller 130 includes a sensor. This sensor may detect whether there is an object (such as a bike in a rack) that needs to be locked with the locking device 100.

In some instances, the controller 130 includes an alarm that provides notification, such as sounds, light, messages to the user and/or master, and/or the like if the locking device 100 has been tampered with.

The controller 130 may include one or more wireless communications modules, such as Near Field Communication and Bluetooth Low Energy. Wireless communications may enable the locking device 100 to connect to the user device 132, the master device 134, and/or the server 136. The controller 130 may more specifically include Wi-Fi and/or cellular communications for connecting to a wide area network for data transfer with the server 136.

Electronic Application

Any of the electronic components disclosed herein may operate and/or communicate with an electronic application (also commonly referred to as an “app”), which may run on the controller 130, the user device 132, the master device 134, and/or the server 136. The app may authenticate the master and/or the user and lock and/or unlock the master loop 114 and/or user loop 112. Further, the app may allow a user to make electronic payments for use of the locking device 100.

The electronic application may indicate the location of the locking device 100. The app may provide the status of the locking device, e.g., whether it is in use, available for use, reserved for a certain date and time, usage, location, etc. The app may display information about a user, such as name, location, preferences, access privileges, payment plan, and/or the like.

If the master of the locking device 100 has a system to register the item being locked, then that information may appear on the app, and may also be found in the user's profile. The app may show/send alerts to the user device 132 and/or the master device 134 if the locking device 100 is tampered with or broken entirely. Further, the app may show/send alerts to the user device 132 and/or the master device 134 if an individual who is not a user or a master attempts to scan or interact with the locking device 100.

The app may optionally generate a notification to the user and/or master when any theft, tampering, and/or other irregularity occurs. In the case of an educational institution such as a university or similar institution, the app may include the option to report the irregularity to campus administrators, police, and/or security. The app may indicate if the locking device 100 was broken or damaged, and can specify the time at which such an event took place, which can be useful if there are cameras in the area.

The app may also display to the user and/or master which locking devices 100 have been used the most and which locks have not been used. This information can be used to indicate that a locking device 100 is being avoided for some particular reason, such as it is in a dark area, it is completely unresponsive, it is difficult to access due to overgrowth or some other reason, or the like. The master can use such information to make adjustments, such as to move the locking device 100 to a different location.

The app may include a lock reservation feature. With this feature, the user may be able to reserve the locking device 100 for a certain time in the future (assuming it is available). The user may have the ability to specify a reservation schedule (for example, when they have classes, they can reserve locks outside their class buildings). The app may learn about the user's habits and location/time preferences. It may provide reservation suggestions and/or let the user know how many locks are available in a preferred (or preset) area.

The app may include a map showing the location of the user or master, and all of the locking devices 100 in an area. Further, the map may show the locking devices 100 that are in use, reserved for a time within a predetermined time frame, and/or open (and not reserved). The user or master may select a lock area and the map may show how many locking devices 100 are available and how far they are from the user.

The app may show the battery level of the locking device 100 that the user intends to use. The app may indicate whether the locking device 100 is out of order. The app may allow the user to send an error message directly to the master of the lock. The app may alert the user if the locking device 100 is not correctly locked within a predetermined amount of time.

The app may identify the locking device 100 that the user intends to use via any known method, including but not limited to QR codes, bar codes, an alphanumeric code input by the user, and/or the like. The app may activate the locking device 100 and can use AR augmented images to allow the user to authenticate for that individual lock. The location of the locking device 100 that the user is currently using may be displayed on any suitable mapping or tracking app, such as Apple Maps, Google Maps, Find My, and/or the like. The app may include video tutorials demonstrating how to correctly use the locking device 100 and/or the app.

Server

In some instances, the locking device 100 connects to the user device 132, the master device 134, and/or other devices via the server 136, via a secure communication link. In some instances, a master or user sends an unlock code to the server 136; the server may then send that code to the locking device 100 to unlock it.

The server 136 may be connected to the user device 132, the master device 134 and/or other devices via local Wi-Fi connections and/or via cellular connectivity for broader coverage. A local backup unlock/lock mechanism may be provided if wireless connectivity is unavailable.

Use Cases and Methods of Operation

Exemplary methods for deploying and employing the locking device 100 will now be described.

There are industries, areas and/or scenarios in which an electric lock, with or without policy-driven access, would be particularly beneficial. An example of this is securing or locking personal transportation vehicles. Personal transportation vehicles include but are not limited to bicycles, electric bicycles, tricycles, scooters, electric scooters, skateboards, motorcycles, motor vehicles, aircraft, boats, and the like.

The locking device 100 may be combined with a charging station for electric personal transportation vehicles. Locations of where a bicycle may be locked include but are not limited to campuses, city areas, transit hubs, parks, residential areas, offices, hospitals, and the like.

Further, aside from storage of personal transportation vehicles, the locking device 100 may be used to secure material that should not be accessible to everyone. For example, hospitals have material such as drugs, equipment carts, crash carts, beds, and the like. Other institutions may house dangerous devices that could also beneficially be secured by the locking device 100. For example, such dangerous devices include but are not limited to firearms, weapons, explosive devices, incendiary devices, and the like.

Another example of equipment that could be secured with the locking device 100 is catering equipment. Catering equipment includes but is not limited to wheeled trolleys/carts, automobiles, dollies, and the like.

Another example of equipment that could be secured with the locking device 100 is musical equipment. Musical equipment includes but it is not limited to musical instruments, speakers, amplifiers, and the like.

One example of a setting at which the locking device 100 could beneficially be used in a transit hub. Transit hubs include but are not limited to airports, train stations, bus stops, boat terminals, and the like. People at transit hubs may have personal goods they wish to secure. Personal goods include but are not limited to suitcases, luggage, bags, and the like.

Another setting at which the locking device 100 could be used is public transportation. Public transport includes but is not limited to trains, planes, boats, buses, and the like. People on public transport may have personal goods they wish to secure.

Another setting at which the locking device 100 could be used is academic centers. Academic centers may have equipment that only certain people are authorized to access. This equipment includes but is not limited to bags, computers, televisions, smart boards, writing utensils, stationary, office supplies, lab equipment, and the like.

Another setting at which the locking device 100 could be used is to secure office equipment and/or supplies. Office equipment includes but is not limited to desks, chairs, photocopiers, printers, tables, computers, televisions, and the like.

Another setting at which the locking device 100 could be used is securing gym equipment. Gym equipment includes but is not limited to weight machines, rowing machines, weight racks, treadmills, benches, squat racks, elliptical machines, and the like.

Although reference is made to the locking device 100, the use cases and methods may be applied to a locking device 100 according to any embodiment within the scope of this disclosure. Further, the methods set forth herein may generally be performed by a master or a user. In some instances, the user and the master are the same person. In other instances, the user and the master are different people.

In some instances, the user may or may not unlock or control the user loop 112. Further, in some instances, the user may or may not unlock or control the master loop 114. Yet further, in some instances, the master may or may not unlock or control the master loop 114. Still further, in some instances, the master may or may not unlock or control the user loop 112.

In some instances, a locking device may not have a power source. In such a case, the user and/or the master may use a locking/unlocking mechanism that operates mechanically and does not require electricity or power to operate. The passwords for keypads or combination locks that are on locking devices may optionally be set by the master, and given to the user in the event that the primary locking mechanism fails. In at least one embodiment, the passwords may be sent to the user via text message or other means.

One region of the hub 110 may be accessible by a master and another region may be accessible by a user. Bifurcated hubs for the user locking mechanism 122 and the master locking mechanism 124 will be shown and described below in connection with additional embodiments.

In some instances, methods of using the locking devices 100 may include activating at least one component of the locking device 100. In some instances, once the locking device 100 is activated, the user or master then interacts with the locking device 100.

In some instances, the locking device 100 includes a button (e.g., an "on" button), and the method may include pressing the button to activate at least one component of the locking device 100. In some instances, the method may include tapping the locking device 100 to activate at least one component of the locking device 100. In some instances, the method includes shaking the locking device 100 to activate at least one component of the locking device 100. In some instances, the method includes walking up to the locking device 100 to activate at least one component of the locking device 100, for example, via a motion sensor, near field communication, geofencing, and/or the like.

In some instances, a component of the locking device 100, or a structure associated with the locking device 100, may include a sensor, and the method may include placing an object to be locked on the locking device 100 or item 104, thereby activating at least one component of the locking device 100.

In some instances, a component of the locking device 100, or a structure associated with the locking device, has a heat sensor and/or lidar device, and the method may include approaching the locking device 100 and activating it with body presence or body heat. In some instances, the user or master may bring a mobile or smart device such as the user device 132 or the master device 134 near the locking device 100 to activate the system, e.g., within about 50 feet, about 40 feet, about 30 feet, or about 20 feet.

The lock may have a "resting position." This resting position may be near a "table" or mesh net. The user may place their smart device on the table to allow Near Field Communication with the locking device 100. Once the locking device 100 is placed on the table, this may allow the locking device 100 to connect via Near Field Communication to control the locking device 100.

In some instances, the primary activation method may fail. In such a case, a backup activation method may be used. This backup activation method may be any one or more of the previously outlined activation methods.

In areas with several items 104 such as structures, there may be a camera at an elevated location. The camera may be able to recognize humans (for example using facial recognition technology), identify which locking device 100 the user or master intends to use, and activate it. There may be time limits between activating and interacting with the locking device 100. For example, if the locking device 100 is activated, but no unlocking or locking action is taken within the next 10 second, 15 seconds, 20 seconds, 30 seconds, 45 seconds, 60 seconds, 120 seconds, or any other suitable other time limit, the locking device 100 may deactivate until it is activated again.

The user or master may have a certain time in which to correctly (un) lock the lock before they are notified through the app and/or an alarm on the lock.

When one or more locking devices 100 are installed, the master may preset the location(s). These locations may be displayed within the app. There may be a GPS tracker installed in the center hub 110, the user loops 112, and/or the master loop 114. This location will be displayed on the map presented by the app.

When within a certain distance from each other, the locations of the center hub 110, the user loops 112, and the master loop 114 may be considered to be the "same." Conversely, when they are at least a certain distance apart, they may be displayed as three separate locations on the map.

Additional Embodiments

The locking device 100 of FIG. 1 is merely exemplary. Many different configurations of locking devices are envisioned within the scope of this disclosure. For example, for illustrative purposes, FIG. 1 shows only one user loop 112, one master loop 114, and one hub 110. In alternative embodiments, multiple user loops and/or multiple master loops may be present. All may be securable to a single hub, or multiple hubs may be used.

Further, in some embodiments, a hub may have multiple components that are movably coupled together (for example, via a pin joint) to enable variation in orientation between the user and master loops. A hub with multiple components may have components with additional locking mechanisms that allow the hub components to be locked to and/or detached from each other. In some examples, user loops and/or master loops may be chained together to provide added length and/or the ability to lock to multiple objects and/or items.

Yet further, each of the user loop(s) and/or the master loop(s) may be rigidly or movably coupled to the hub. Each of the user loops and/or master loops may, if rigid, have a shape designed to accommodate the associated object, item, or structure. For example, a hexagonal master loop (not shown) may be used to encircle and capture the hexagonal shaft of a lamp post.

Still further, various different locking mechanisms may be used. Some may only be actuatable directly by the user, some may only be electronically actuated, and some may be actuatable either by the user or electronically via a controller. Some may require mechanical user actuation and electronic actuation in order to lock and/or unlock the locking mechanism. The user locking mechanism and the master locking mechanism may have the same configuration, or may be configured differently. In some embodiments, the user locking mechanism and the master locking mechanism may be independently lockable to and/or unlockable from the hub so that the locking device can be locked to and unlocked from the object independently of locking the locking device to and unlocking the locking device from the item. Some of these embodiments will be shown and described in greater detail below.

Figure 2:
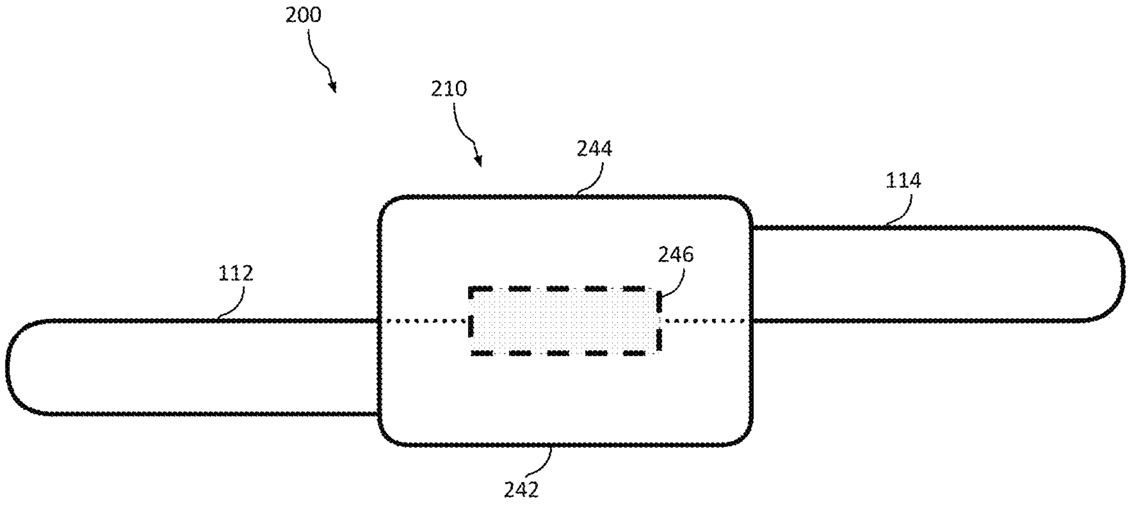
FIG. 2 is a side view of a locking device according to one embodiment.

FIG. 2 is a side view of a locking device 200 according to one alternative embodiment. As shown, the locking device 200 may have a user loop 112 and a master loop 114 like those of the locking device 100 of FIG. 1. However, the locking device 200 may also have a hub 210 with a bifurcated configuration, with a user component 242 that holds the user locking mechanism 122 (not shown in FIG. 2) and a master component 244 that holds the master locking mechanism 124 (also not shown in FIG. 2). The user component 242 and the master component 244 may optionally share a controller 130 (not shown in FIG. 2), or in the alternative, a controller 130 (e.g., a user controller and a master controller) may be present in each of the user component 242 and the master component 244, respectively.

The user component 242 and the master component 244 may be disposed in the same housing, and simply displaced relative to each other within the housing. In the alternative, the user component 242 and the master component 244 may each have a separate housing. In such embodiments, the user component 242 and the master component 244 may be movable relative to each other. If desired, the user component 242 and the master component 244 may be lockable to each other, and unlockable from each other, via a hub locking mechanism 246, which may be user-actuated and/or electronically actuated.

Operation of the hub locking mechanism 246 may be independent of the user locking mechanism 122 and/or the master locking mechanism 124. Thus, if desired, the user component 242 and the master component 244 may be detached from each other while leaving the user component 242 secured to the object 102 via the user loop 112, and leaving the master component 244 secured to the item 104 via the master loop 114.

Figure 3:
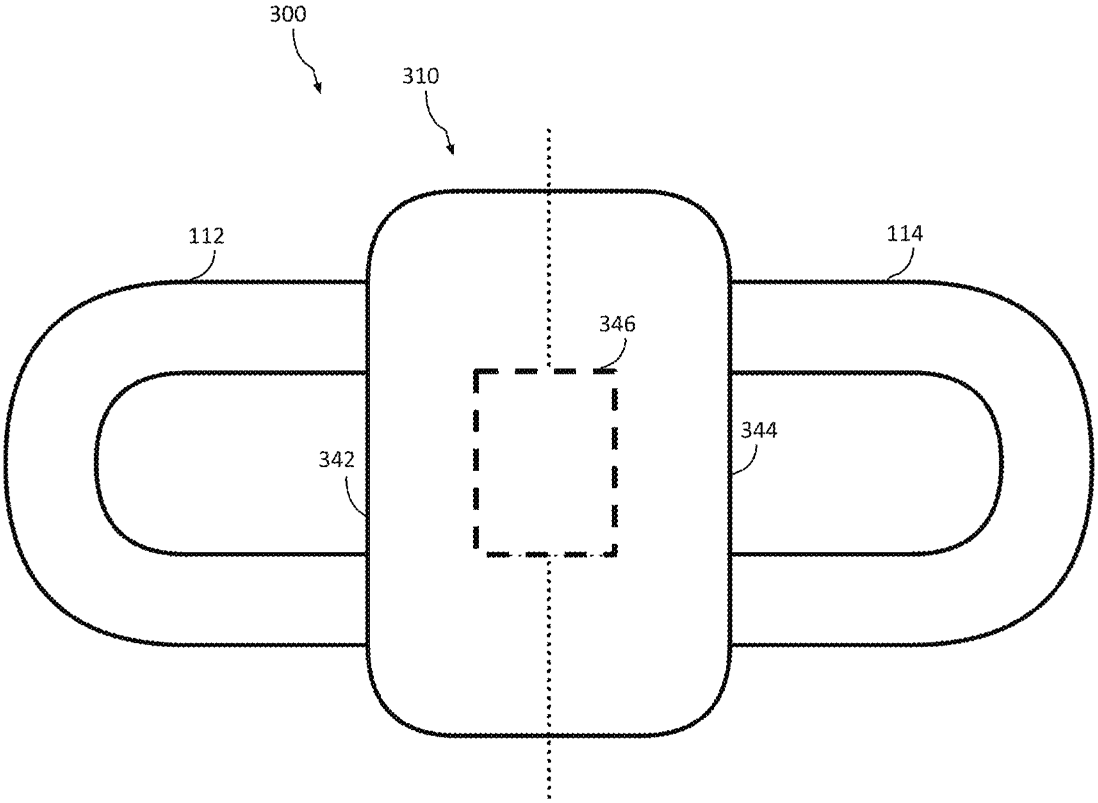
FIG. 3 is a top view of a locking device according to one embodiment.

FIG. 3 is a top view of a locking device 300 according to another alternative embodiment. Like the locking device 200 of FIG. 2, the locking device 300 may have a hub 310, a user loop 112, and a master loop 114. The hub 310 may have a user component 342 and a master component 344. However, rather than being stacked vertically, the user component 342 and the master component 344, and their corresponding locking mechanisms, may be arranged side-by-side. As in the locking device 200, the user component 342 and the master component 344 may be integrated, or may be detachable from each other, for example, via a hub locking mechanism 346.

Figure 4:
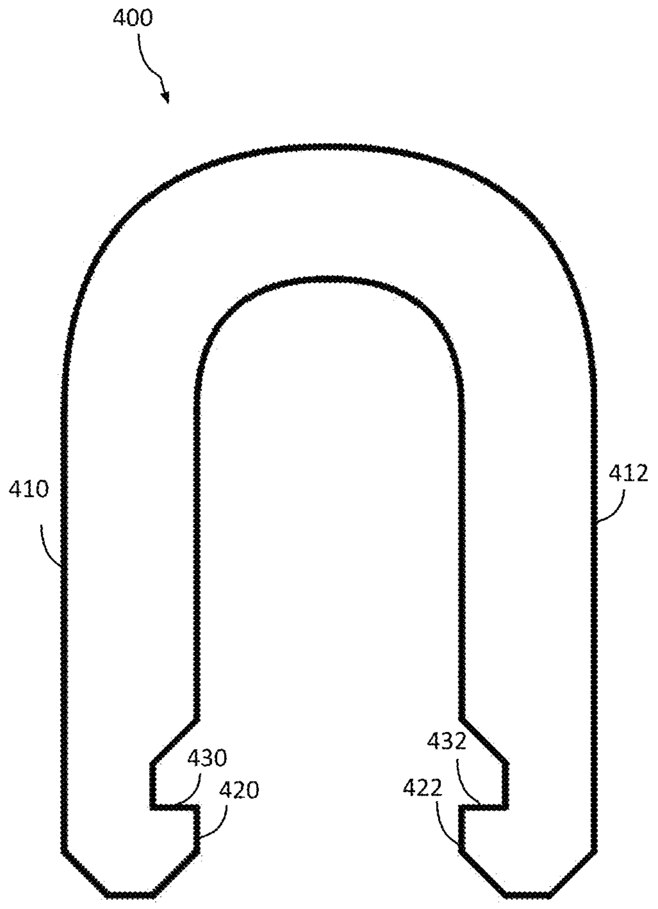
FIG. 4 is a top view of a loop of the locking device of FIG. 1, according to one embodiment.

FIG. 4 is a top view of a loop 400, for example, the user loop 112, of the locking device 100 of FIG. 1, according to one embodiment. The loop 400 may be configured as the U-shaped locking element of a "D lock" as known in the art. Alternatively, the loop 400 may have a different configuration.

As shown in FIG. 4, the loop 400 may have a first prong 410 and a second prong 412, which may terminate in a first barb 420 and a second barb 422, respectively. The first barb 420 and the second barb 422 may project generally transverse to the length of the first prong 410 and the second prong 412, respectively, leaving a first locking surface 430 and a second locking surface 432 that are positioned to interfere with removal of the first prong 410 and the second prong 412, respectively, from the hub 110, when the user locking mechanism 122 is in the locked configuration.

Figure 5:
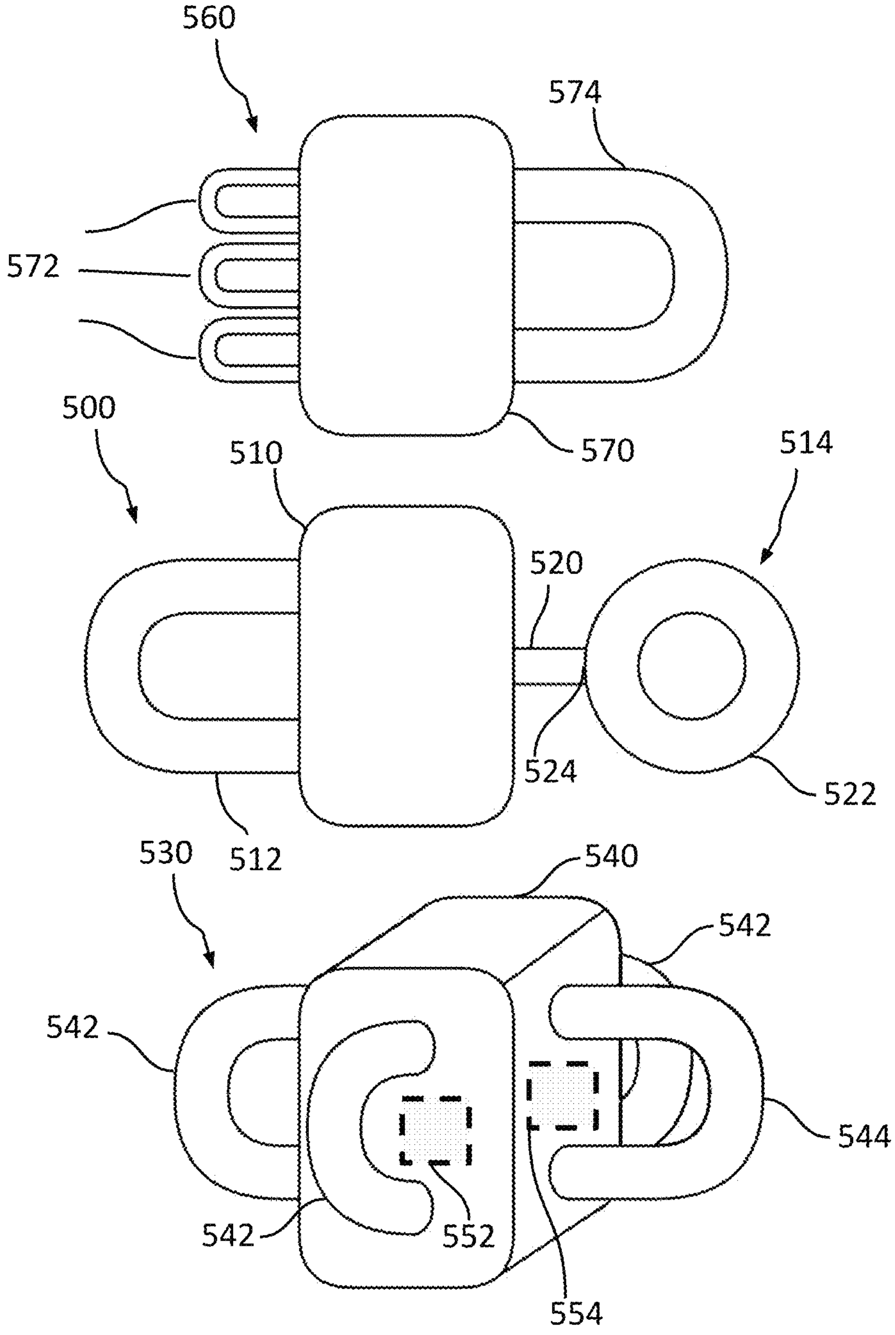
FIG. 5 depicts elevation and perspective views of locking devices according to some embodiments.

FIG. 5 depicts elevation and perspective views of locking devices 560, 500, and 530, according to some embodiments.

The locking device 560 shown in the top elevation view at the top of FIG. 5 may have a hub 570, three user loops 572, and a master loop 574. The user loops 572 may all extend from the same face of the locking device 560, adjacent to each other. However, if desired, the user loops 572 may be flexible (for example, chains and/or cables) so that the user loops 572 can be spread apart, leaving room for each to lock a separate object to the hub 570. Each of the user loops 572 may be lockable and/or unlockable relative to the hub 570 with a user locking mechanism (not shown), which may be usable independently of each other and/or of a master locking mechanism (not shown) by which the master loop 574 is lockable and/or unlockable relative to the hub 570.

As shown in the elevation view in the middle, the locking device 500 may have a hub 510, a user loop 512, and a master loop 514. The hub 510 and the user loop 512 may be similar to those of the locking device 100 of FIG. 1. Conversely, the master loop 514 may have a different shape, which may be adapted to attachment to a different type of item. The master loop 514 may, for example, have a flexible tether 520 secured to a ring 522 that can, in turn, be secured to the item. The flexible tether 520 may be welded, fastened, and/or otherwise secured to the ring 522 at an attachment point 524. The free end of the flexible tether 520 may be locked to and/or unlocked from the hub 510 via a master locking mechanism (not shown).

The locking device 530 shown in the perspective view at the bottom of FIG. 5 may have a hub 540, three user loops 542, and a master loop 544. The hub 540 may have a rectangular-prismatic shape, with the master loop 544 extending from one face, and each of the user loops 542 extending from another face of the hub 540. Thus, the user loops 542 may all extend in different directions. This arrangement may facilitate independently locking different objects to the hub 540 with the user loops 542, while providing sufficient space for each of the objects. Each of the user loops 542 may optionally be lockable and/or unlockable relative to the hub 540 with a user locking mechanism 552, which may be usable independently of each other and/or of a master locking mechanism 554 by which the master loop 544 is lockable and/or unlockable relative to the hub 540.

Figure 6:
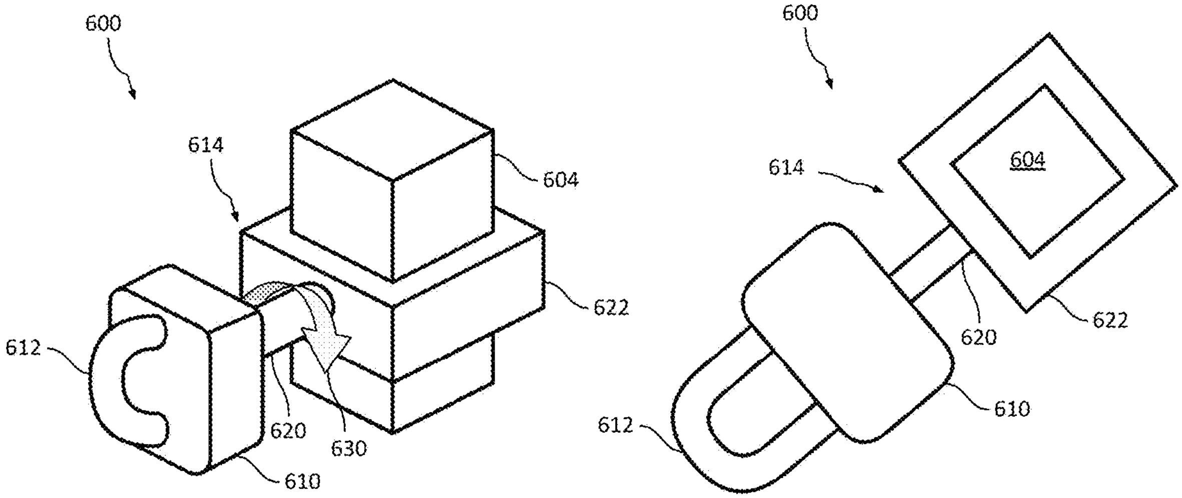
FIG. 6 is a perspective view of a locking device in isolation, and secured to a lamppost, according to one embodiment.

FIG. 6 is a perspective view of a locking device 600 in isolation, secured to an item 104 in the form of a lamppost 604, according to one embodiment. The locking device 600 may be similar to the locking device 500 of FIG. 5, with a hub 610, a user loop 612, and a master loop 614 that may include a flexible tether 620 which may be flexible or non-flexible, and which may be secured to a ring 622. In the case of the locking device 600, the ring 622 may have a shape that matches that of the cross section of the shaft of the lamppost 604, which may be square.

If desired, the ring 622 may be sized and shaped to fit snugly around the lamppost 604 to maintain the locking device 600 in a particular orientation relative to the lamppost 604. If desired, multiple such locking devices may be secured to the lamppost 604, with the hub 610 and user loop 612 of each extending from the lamppost 604 in a different direction to secure more than one object 102 to the lamppost 604.

The hub 610 may advantageously be rotatably coupled to the master loop 614 such that the hub 610 and the user loop 612 can rotate as indicated by the arrow 630. This rotation may provide flexibility in the types of objects that can be secured to the lamppost 604 and/or the orientation in which such objects can be disposed. For example, a bicycle may have a horizontal or oblique crossbar on the frame, to which the user loop 612 is to be secured. By contrast, a scooter may have a vertical bar to which the user loop 612 is to be secured. Rotation of the hub 610 and the user loop 612 as indicated by the arrow 630 may facilitate use of the locking device 600 with any such objects.

Figure 7:
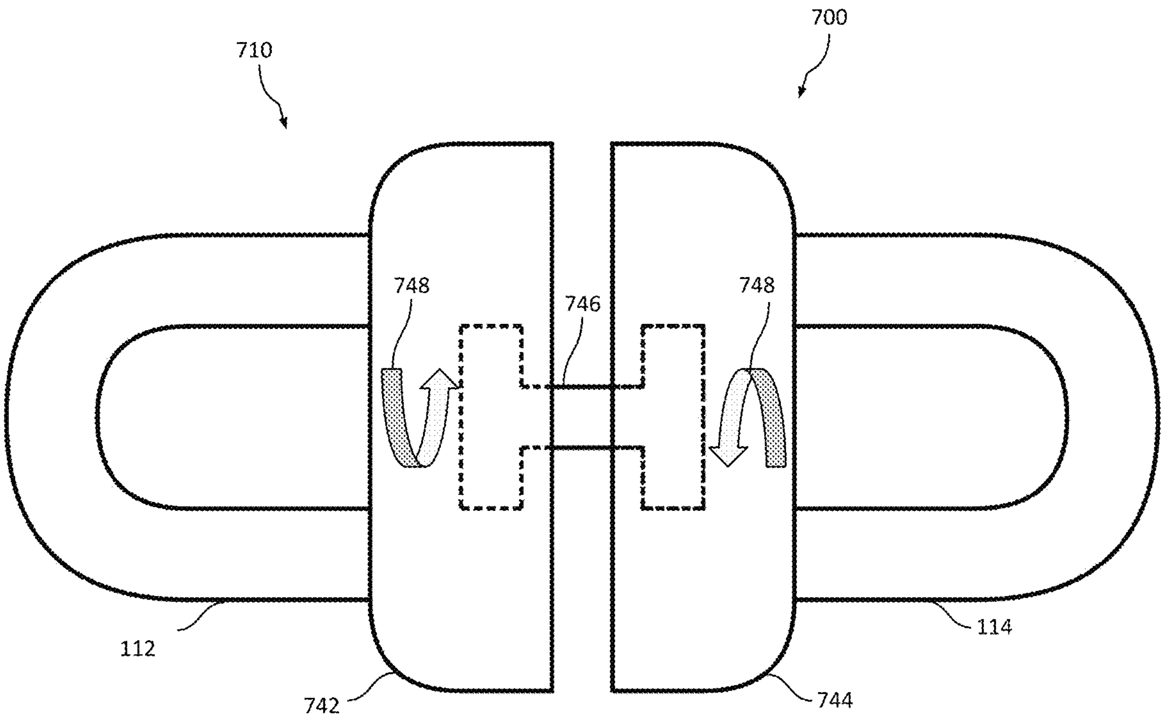
FIG. 7 is a top view of a locking device with a bifurcated hub, according to one embodiment.

FIG. 7 is a top view of a locking device 700 with a bifurcated hub 710, according to one embodiment. Like the locking device 200 of FIG. 2 and the locking device 300 of FIG. 3, the hub 710 may have a user component 742 and a master component 744, which may be lockable to and/or unlockable from a user loop 112 and a master loop 114, respectively. The user component 742 and the master component 744 may be rotatably coupled together, for example, with a pin 746 that is rotatably coupled to one or both of the user component 742 and the master component 744.

Thus, the user loop and the master loop may be freely rotated relative to each other by rotating the user component 742 relative to the master component 744, as indicated by the arrows 748. This rotation may provide greater flexibility in the types of objects that can be secured and/or the orientation in which such objects can be secured, as mentioned above.

Figure 8:
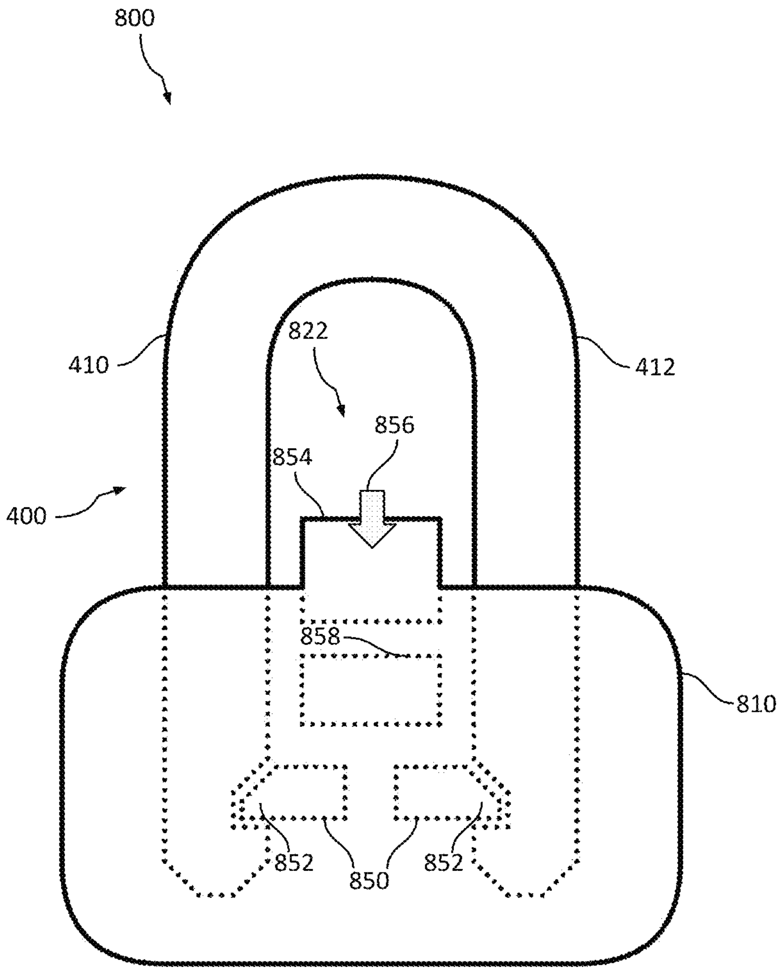
FIG. 8 is a top, section view of a locking device showing a locking mechanism according to one embodiment.

FIG. 8 is a top, section view of a locking device 800 showing a locking mechanism 822 according to one embodiment. As in previous embodiments, the locking device 800 may have a hub 810 coupled to user loop and a master loop; either or both of these may take the form of the loop 400 of FIG. 4, with a rigid construction having a first prong 410 and a second prong 412. The first prong 410 may have a first barb 420 and a first locking surface 430, and the second prong 412 may have a second barb 422 and a second locking surface 432, as illustrated in FIG. 4. These features are not shown in FIG. 8.

The locking mechanism 822 may be used to selectively lock the loop 400 to the hub 810 and unlock the loop 400 from the hub 810. The locking mechanism 822 may include pins 850 that can slide into and out of the recesses defined by the first barb 420 and the second barb 422. Thus, the pins 850 may have an unlocked configuration, as shown in solid lines in FIG. 8, in which the pins 850 do not abut the first locking surface 430 and the second locking surface 432, and a locked configuration 852, in which the pins 850 are positioned to physically interfere with withdrawal of the loop 400 from the hub 810 via abutment of the pins 850 with the first locking surface 430 and the second locking surface 432.

The locking mechanism 822 may be designed to be actuated mechanically by the user. This actuation mechanism may be exclusive, or may be in addition to electronic actuation (for example, via a controller 130 as in FIG. 1—not shown in FIG. 8). Thus, the locking mechanism 822 may have a mechanical input such as a button 854, which may protrude from the housing of the hub 810 such that a user can press the button 854, for example, in the direction indicated by the arrow 856. Notably. The button 854 is merely exemplary; a wide variety of other mechanical inputs could be used, including but not limited to switches, dials, levers, and the like. The button 854 may be operatively connected to the pins 850 through the use of any known mechanical coupling, including but not limited to gearing, linkages, belts, and the like, such that pressing the button 854 as indicated by the arrows 856 retracts the pins 850 to the unlocked position.

In some embodiments, the locking mechanism 822 may be mechanically lockable, but may require both mechanical actuation and electronic actuation in order to unlock the object 102 from the locking device 800. For example, the button 854 may not be pressable unless the controller 130 has put the locking mechanism 822 in a configuration in which the locking mechanism 822 can be mechanically unlocked. This may be done, for example, in response to an unlock command from the user device 132, which may be transmitted wirelessly to the controller 130.

Thus, the locking mechanism 822 may also have a block 858 that interferes with pressing the button 854, interferes with motion of the pins 850 to the unlocked position, and/or interferes with the mechanical coupling between the button 854 and the pins 850. As shown in FIG. 8, the block 858 may be positioned in a locked position, in which the block resides underneath the button 854 to interfere with pressing the button 854. The block 858 may be movable (for example, by sliding the block 858 downward, to the left, to the right, into the page, and/or out of the page, with respect to the view of FIG. 8, and/or rotating the block 858) to an unlocked position in which the block 858 permits the button 854 to be pressed to move the pins 850 to the unlocked position.

In some embodiments, the position of the block 858 may be controlled by the controller 130. For example, the controller 130 may be coupled to an electrically operated actuator (not shown in FIG. 8) that moves the block 858 in response to a signal from the controller 130. For example, a solenoid, electric motor, piezoelectric device, electromagnet, and/or other electrically operated actuator may be connected to the controller 130 and operable to move the block 858. In some embodiments, a spring or other biasing element (not shown) may bias the block 858 in the locked position, and the block 858 may be temporarily movable to the unlocked position in response to operation of the electrically operated actuator.

In some embodiments, the block 858 may be moved to the unlocked position by the controller, and may remain there until the locking mechanism 822 is mechanically operated to unlock the loop 400. In such embodiments, once the user unlocks the locking device 800 (for example, via the user device 132), the locking mechanism 822 may remain mechanically operable until it has been fully unlocked by pressing the button 854. In alternative embodiments, the block 858 may only remain in the unlocked position temporarily, for example, for a predetermined period of time, before returning to the locked position. If the locking mechanism 822 is not mechanically actuated while the block 858 is in the unlocked position, the user may need to once again send the unlocking command (for example, via the user device 132) to again move the block 858 to the unlocked position so that the locking mechanism 822 can be mechanically unlocked.

Figure 9:
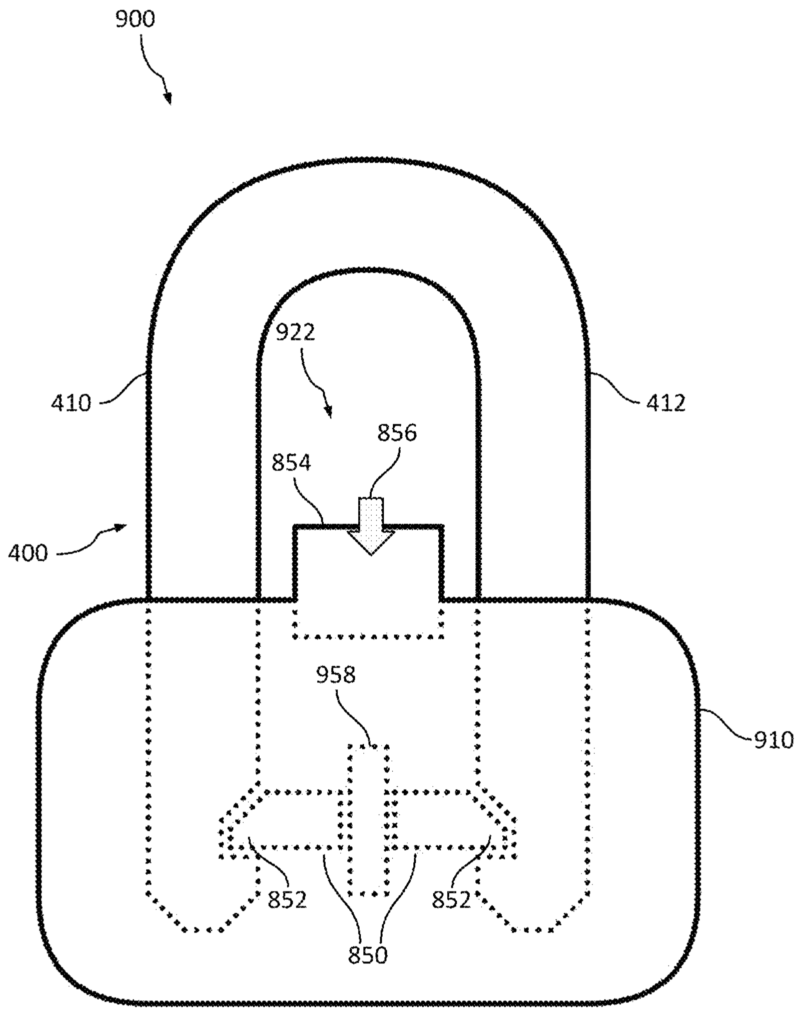
FIG. 9 is a top, section view of a locking device showing a locking mechanism according to one embodiment.

FIG. 9 is a top, section view of a locking device 900 with a locking mechanism 922 according to another embodiment. As shown, the locking device 900 is similar to the locking device 800 of FIG. 8, and has many of the same components, including the loop 400. The locking device 900 may also have a hub 910 to which the loop 400 can be released and secured.

The locking mechanism 922 may be different in operation from the locking mechanism 822 in that the locking mechanism 922 may have a block 958 that is positioned, in the locked configuration, between the pins 850. Thus, the block 958 may interfere with motion of the pins 850 from the locked configuration 852 to the unlocked configuration of FIG. 9.

In order to move the locking mechanism to the unlocked configuration, the block 958 may be moved, for example, via an electrically operated actuator, from the locked position of FIG. 9 to an unlocked position in which the block 958 is no longer positioned between the pins 850, or otherwise no longer impedes motion of the pins 850 toward each other. The block 958 may be translated and/or rotated in a variety of ways between the locked and unlocked positions.

Figure 10A:
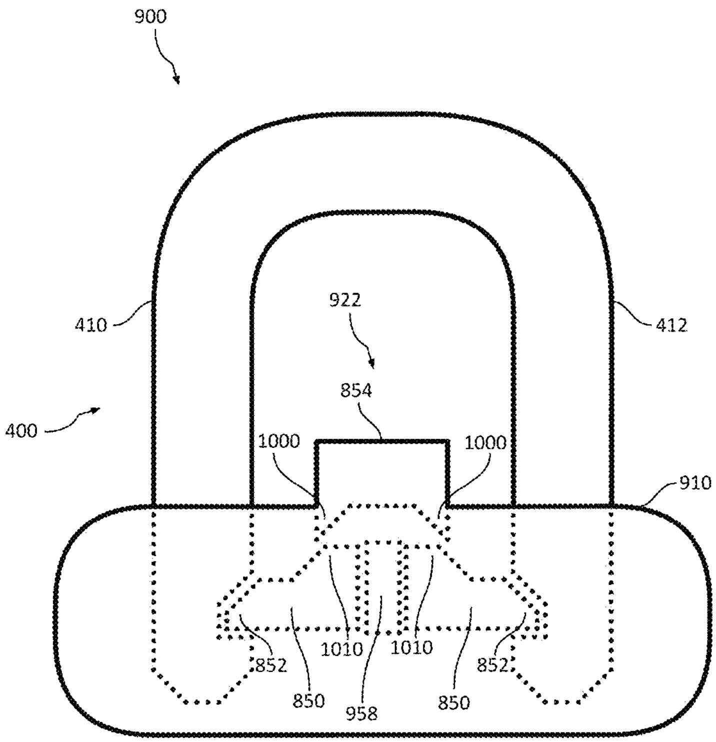
FIGS. 10A and 10B are top, section views of the locking device of FIG. 9 with the locking mechanism in the locked and unlocked configurations, respectively.
Figure 10B:
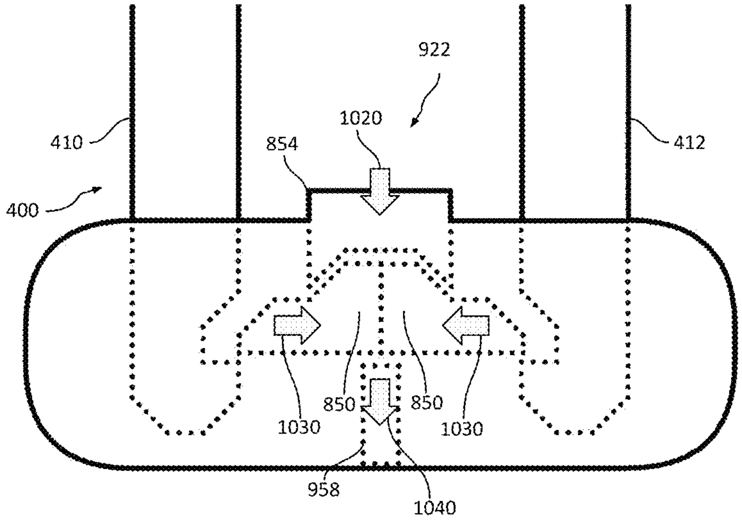

FIGS. 10A and 10B are top, section views of the locking device 900 of FIG. 9 with the locking mechanism 922 in the locked and unlocked configurations, respectively. FIGS. 10A and 10B illustrate possible operation of the locking mechanism 922 in greater detail.

As shown, the button 854 may have beveled surfaces 1000 facing toward the pins 850. The pins 850 may have flared ends 1010, which may be angled to match the angulation of the beveled surfaces 1000. This angle may be, for example, 45°. The beveled surfaces 1000 may be angled inward such that, when the button 854 is pressed along the direction indicated by the arrow 1020, the pins 850 are urged to move inward, to the unlocked position, as indicated by the arrows 1030.

When in the locked position, the block 958 may be positioned between the pins 850 to block motion of the pins 850 to the unlocked position. Motion of the block 958 along the direction indicated by the arrow 1040 may remove the block 958 from the space between the pins 850, allowing the pins 850 to move toward each other and to the unlocked configuration, thereby allowing the loop 400 to be withdrawn from the hub 910.

Figure 11:
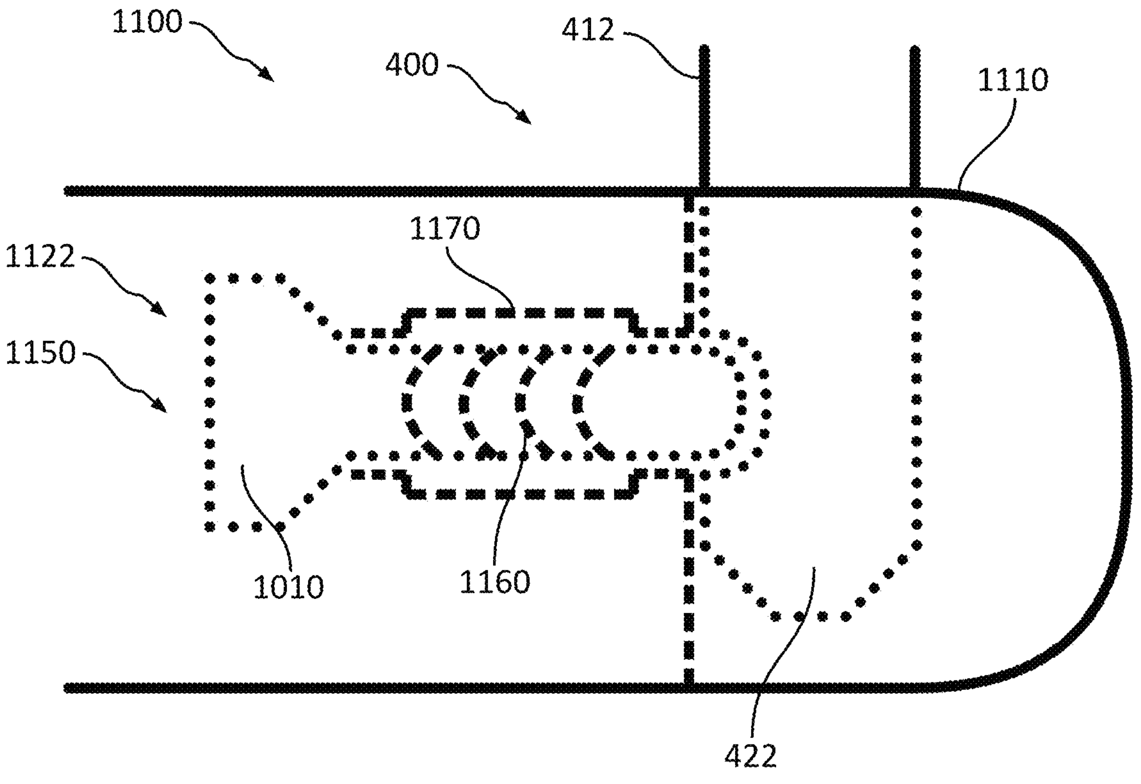
FIG. 11 is a top, section view of part of a locking device with a locking mechanism including a spring-loaded pin, according to one embodiment.

FIG. 11 is a top, section view of part of a locking device 1100 with a locking mechanism 1122 including spring-loaded pins 1150, according to one embodiment. Only one of the spring-loaded pins 1150 is shown in FIG. 11.

As shown, the locking device 1100 may have a hub 1110 and a user loop in the form of the loop 400 of FIG. 4. Each of the spring-loaded pins 1150 may be configured in a manner similar to that of the pins 850 of FIG. 10A and FIG. 10B, with flared ends 1010. Further, each of the spring-loaded pins 1150 may have a spring 1160 encircling the exterior of the pin. The spring 1160 may reside in a cavity 1170 formed in the housing of the hub 1110, and may be positioned such that the spring 1160 is compressed as the pin moves to the unlocked position. Thus, the spring 1160 may bias the pin back to the locked position.

Figure 12A:
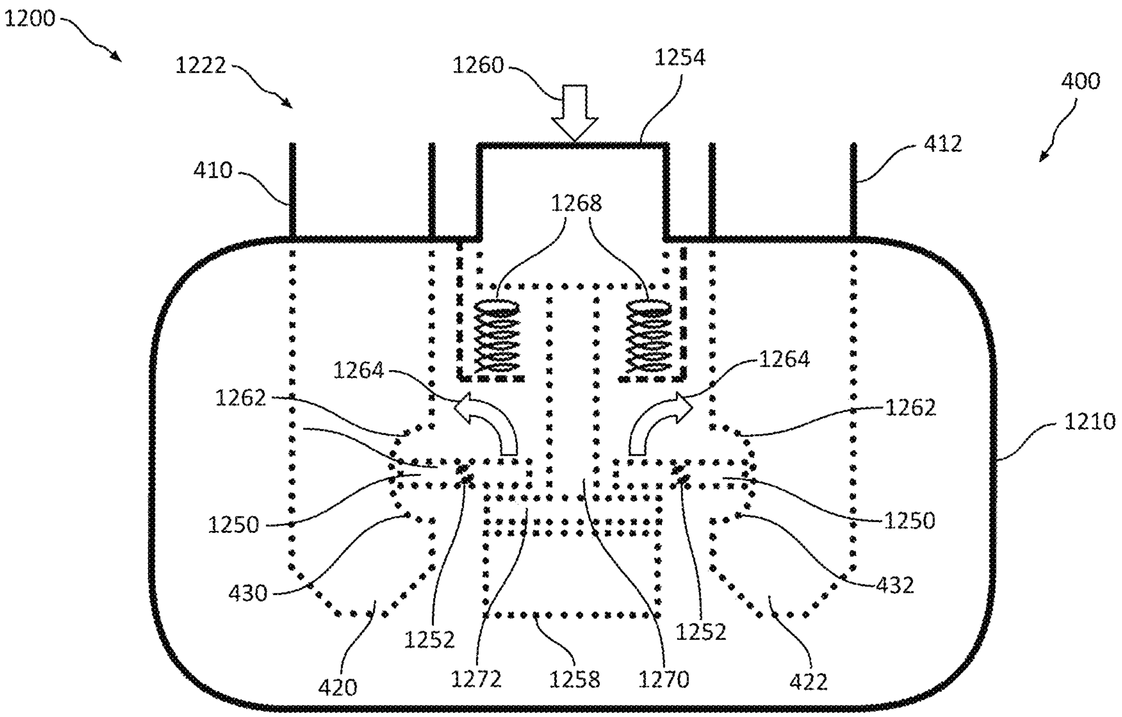
FIGS. 12A and 12B are top, section views of a locking device with a locking mechanism according to one embodiment.
Figure 12B:
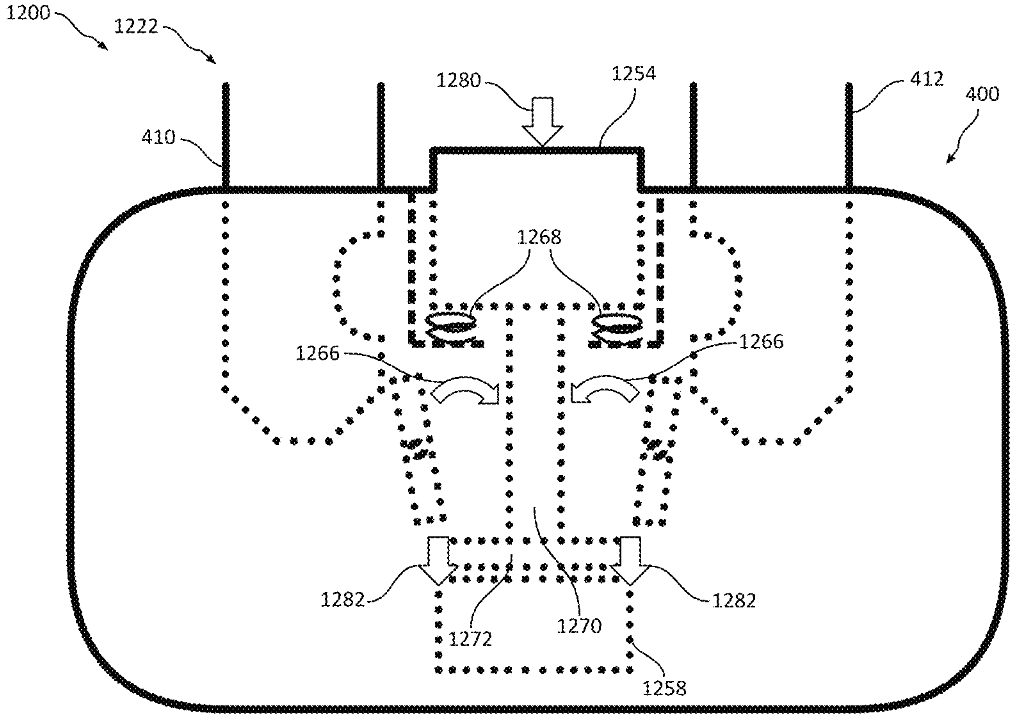

FIGS. 12A and 12B are top, section views of a locking device 1200 with a locking mechanism 1222 according to one embodiment. As shown, the locking device 1200 may have a hub 1210 and at least one loop such as the loop 400 of FIG. 4, which may be a user loop or a master loop. As in the locking device 900 and the locking device 1100, the locking mechanism 1222 may have a pair of pins 1250, a button 1254, and a block 1258.

Rather than translating like the pins 850, the pins 1250 may be rotatably coupled to the hub 1210, for example, via shafts 1252. The pins 1250 may have a locked orientation as shown in FIG. 12A, in which the pins 1250 interfere with withdrawal of the first prong 410 and the second prong 412 from the hub 1210, and an unlocked orientation as shown in FIG. 12B, in which the pins 1250 do not interfere with withdrawal of the first prong 410 and the second prong 412 from the hub 1210.

Motion of the loop 400 into the hub 1210 may rotate the pins 1250 to the locked configuration. Specifically, the loop 400 may be inserted along the direction indicated by the arrows 1260. As the first prong 410 and the second prong 412 enter the hub 1210, the pins 1250 may engage return surfaces 1262 of the recesses in the first prong 410 and the second prong 412 that are defined by the first barb 420 and the second barb 422. The return surfaces 1262 may urge the pins 1250 to rotate as shown by the arrows 1264 to the locked position of FIG. 12A, in which the pins 1250 are oriented generally perpendicular to the first prong 410 and the second prong 412.

In addition to or in the alternative to the foregoing, the pins 1250 may be biased to the unlocked orientation as in FIG. 12B. For example, springs and/or other resilient members may urge the pins 1250 to rotate in the direction indicated by the arrows 1266 of FIG. 12B. However, the button 1254 may also be biased, for example, via springs 1268, outward. In the outward (i.e., unpressed) position, the button 1254 may urge the pins 1250 to move to the locked orientation as in FIG. 12A, urging the pins 1250 to pivot as indicated by the arrows 1264. The biasing force on the button 1254 may be sufficient to overcome the biasing force on the pins 1250.

The button 1254 may be operatively coupled to the pins 1250 by a shaft 1270 extending from the button 1254 and terminating at a plate 1272. The plate 1272 may engage the interior ends of the pins 1250 to urge them to the locked orientation when the button 1254 has not been pressed.

As in the locking device 900 of FIG. 9, the block 1258 may have a locked position as shown in FIG. 12A and an unlocked position as shown in FIG. 12B. In the locked position, the block 1258 may be positioned to prevent the button 1254 from being pressed, as the plate 1272 may be unable to move in a manner that allows the pins 1250 to rotate to the unlocked orientation. Conversely, in the unlocked position, the block 1258 may be moved (for example, away from the button 1254 as shown in FIG. 12B) to allow the plate 1272 to advance, thereby allowing the biasing force on the pins 1250 to rotate them to the unlocked position of FIG. 12B.

Thus, when the user desires to actuate the locking mechanism 1222, they may first trigger motion of the block 1258 to the unlocked position, for example, by sending an "unlock" code from the user device 132. Then, with the block 1258 in the unlocked position, they may press the button 1254 as indicated by the arrow 1280, compressing the springs 1268 and urging the plate 1272 to move into the space formerly occupied by the block 1258, as shown by the arrows 1282. This may, in turn, allow the pins 1250 to rotate to the unlocked orientation, allowing the first prong 410 and the second prong 412 to be withdrawn from the hub 1210 as in FIG. 12B.

Figure 13:
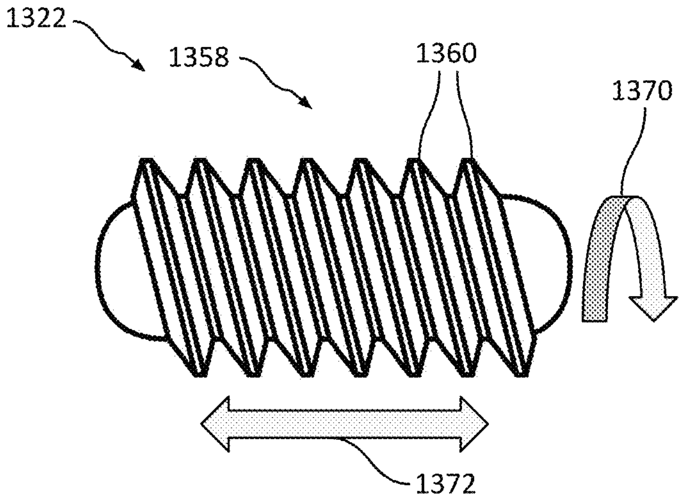
FIG. 13 is a top view of part of a locking mechanism according to one embodiment.

FIG. 13 is a top view of part of a locking mechanism 1322 according to one embodiment. The locking mechanism 1322 may have a block 1358 that moves with a rotating and translating motion. This motion may be obtained, for example, via threads 1360 on the block 1358 that engage with threads of a corresponding hub (not shown). The block 1358 may be rotated by rotary motor, for example, as shown by the arrow 1370. This rotation, coupled with the engagement of the threads 1360 with the housing, may cause the block 1358 to translate as indicated by the arrow 1372.

Figure 14A:
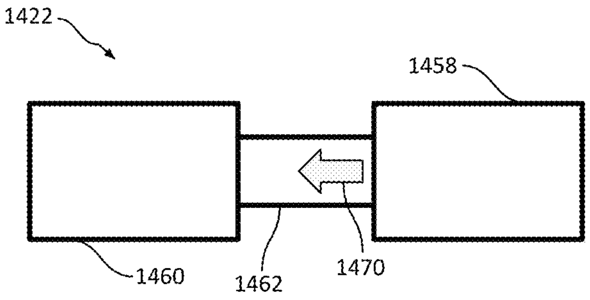
FIGS. 14A and 14B are top views of parts of locking mechanisms according to some embodiments.
Figure 14B:
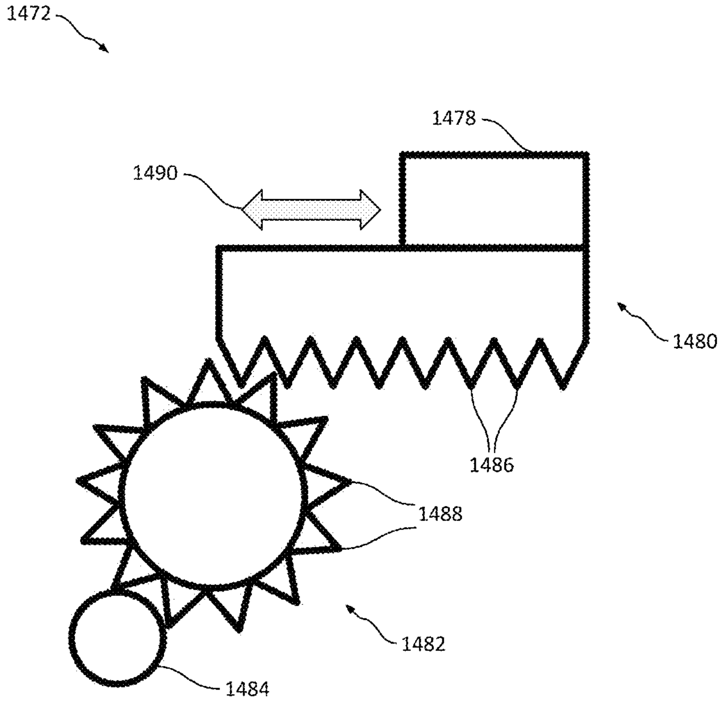

FIGS. 14A and 14B are top views of parts of a locking mechanism 1422 and a locking mechanism 1472, respectively, according to some embodiments. FIGS. 14A and 14B show different methods of electrically actuating a block.

Specifically, the locking mechanism 1422 of FIG. 14A may have a block 1458 that is actuated by a solenoid 1460. The solenoid 1460 may be of any type known in the art, and may be coupled to the block 1458 via a shaft 1462. In response to a signal, the solenoid 1460 may move the shaft, causing the block 1458 to move in the direction shown by the arrows 1470, or in the alternative, in the opposite direction.

The locking mechanism 1472 of FIG. 14B may have a block 1478 that is actuated by a motor-driven rack-and-pinion system. For example, the block 1478 may be secured to a rack 1480, which may be coupled to a pinion 1482. Rotation of the pinion 1482 may be driven by a motor 1484, which may be an electric motor of any known type. The rack 1480 may have teeth that 1486 that mesh with teeth 1488 of the pinion 1482 such that rotation of the pinion 1482 drives translation of the rack 1480 as indicated by the arrow 1490. Thus, the block 1478 may be electrically actuated between locked and unlocked positions.

Figure 15:
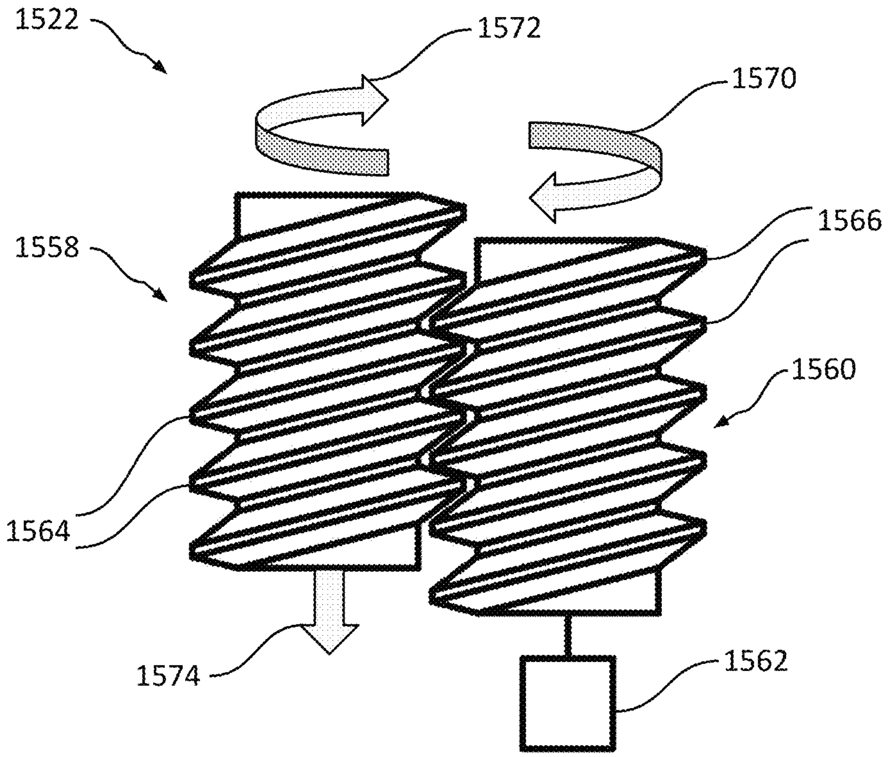
FIG. 15 is a top view of part of a locking mechanism according to one embodiment.

FIG. 15 is a top view of part of a locking mechanism 1522 according to one embodiment. The locking mechanism 1522 may have a block 1558 that is actuated through the use of an alternative gearing system. For example, the block 1558 may be rotated and translated by a screw 1560 that is, in turn, rotated by a motor 1562. The block 1558 may have threads 1564 that engage threads 1566 of the screw 1560. Thus, rotation of the motor 1562 may rotate the screw 1560 as shown by the arrow 1570 to cause the block 1558 to rotate as shown by the arrow 1572 and/or translate as shown by the arrow 1574.

Notably, the block 1558 need not translate and rotate; in some embodiments, the block 1558 may be rotationally constrained such that rotation of the screw 1560 causes the block 1558 to translate. Conversely, in some embodiments, the block 1558 may not be permitted to translate, but may rotate as driven by the screw 1560. Translation and/or rotation may be used to move the block 1558 between the locked and unlocked positions. In at least one embodiment, the screw 1560 can be rotated using a mechanical key in case there is an electrical failure in a motor.

Figure 16:
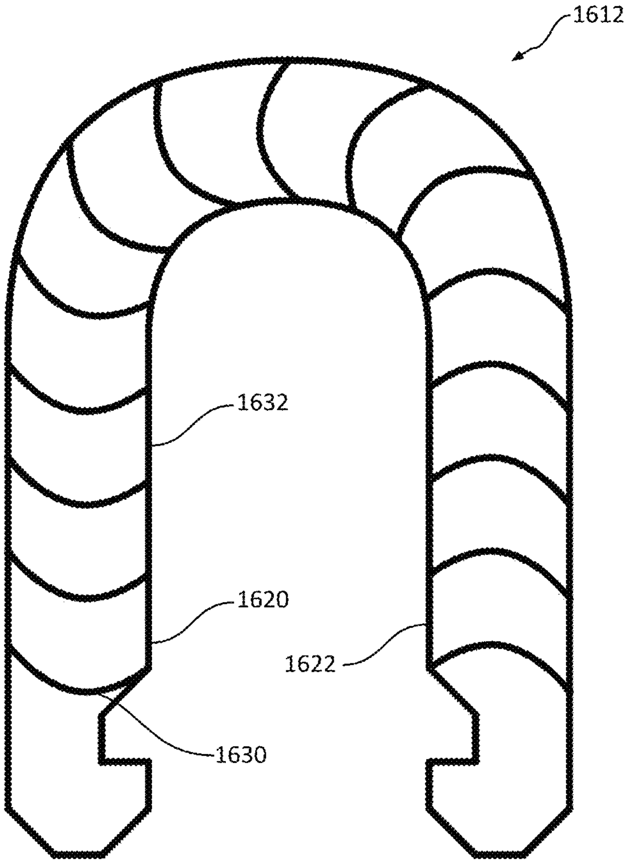
FIG. 16 is a top view of part of a loop according to one embodiment.

FIG. 16 is a top view of part of a loop 1612 according to one embodiment. As shown, the loop 1612 may have a first end 1620 and a second end 1622. The loop 1612 may be a user loop or a master loop. The loop 1612 may have a theft detection mechanism that can detect whether the loop 1612 is damaged or broken, or has been tampered with.

As embodied in FIG. 16, the theft detection mechanism may include a conductive element 1630 wrapped around the loop 1612, extending between the first end 1620 and the second end 1622. The conductive element 1630 may be operatively connected to the controller 130 such that the controller 130 periodically or continuously measures current flow, electrical potential, resistance, and/or other electrical properties of the conductive element 1630 to ascertain whether the conductive element 1630 has been damaged and/or broken. If damage and/or breakage are detected, the controller 130 may transmit a message, for example, to the user device 132 and/or the master device 134, notifying the user and/or the master of the incident.

The loop 1612 may further have a protective sleeve 1632 that covers the loop 1612. The protective sleeve 1632 may further cover the conductive element 1630 to protect the conductive element 1630 from harm and/or maintain the insulated conductive pathway provided by the conductive element 1630. Alternatively, any other suitable element can be used to protect loop 1612.

In alternative embodiments, a theft marking system may be used in addition to or in the alternative to the theft detection system. A theft marking system may be designed to identify the thief or vandal, for example, by spraying ink on the individual immediately upon detection of damage to the loop 1612.

Figure 17A:
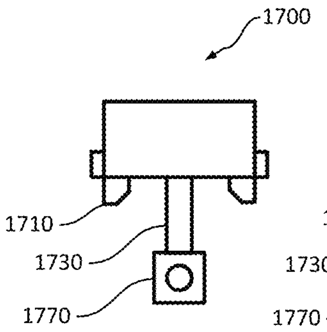
FIGS. 17A, 17B, 17C, 17D, 17E, 17F, 17G, and 17H are paired front and side elevation views of buttons of locking mechanisms according to some embodiments.
Figure 17C:
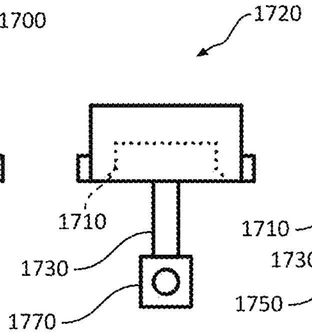
Figure 17E:
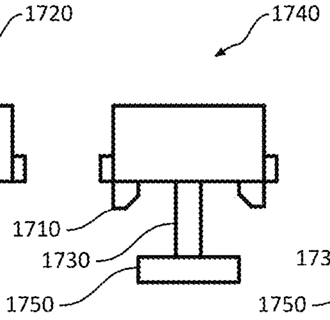
Figure 17G:
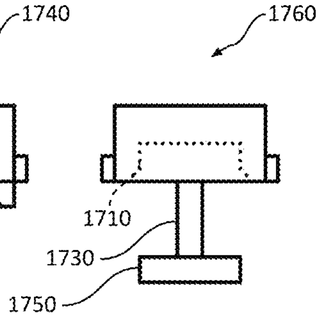
Figure 17B:
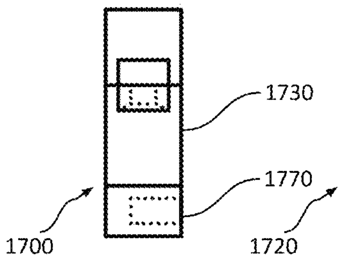
Figure 17D:
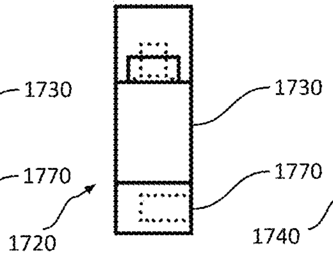
Figure 17F:
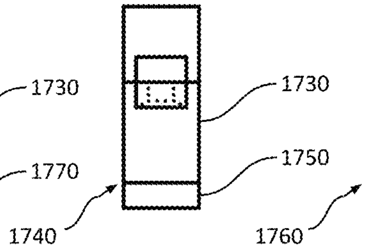
Figure 17H:
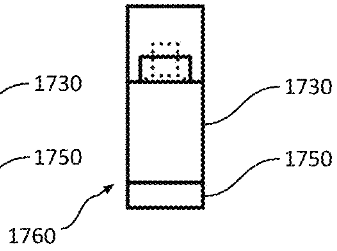

FIGS. 17A, 17B, 17C, 17D, 17E, 17F, 17G, and 17H are paired front and side elevation views of buttons of locking mechanisms according to some embodiments. More specifically, FIGS. 17A and 17B are front and side views, respectively, of a button 1700; FIGS. 17C and 17D are front and side views, respectively, of a button 1720; FIGS. 17E and 17F are front and side views, respectively, of a button 1740; and FIGS. 17G and 17H are front and side views, respectively, of a button 1760.

The buttons 1700, 1720, 1740, and 1760 depict several different features that may be used to connect to other locking mechanism components, such as pins, springs, plates, and blocks.

All of these embodiments may include beveled surfaces 1710 that may be similar in function to the surfaces 1000 of FIGS. 10A and 10B, and may enable the buttons 1700, 1720, 1740, and 1760 to actuate pins such as the pins 850 in a direction transverse to the direction in which the buttons 1700, 1720, 1740, and 1760 are pressed. These beveled surfaces may be internal or external to the button.

Further, all of these embodiments may include a shaft 1730 and a plate 1750 or mounting boss 1770 that can be operatively connected to a block to enable the block to be electronically actuated to determine whether the user is able to press the buttons 1700, 1720, 1740, and/or 1760.

Figure 18A:
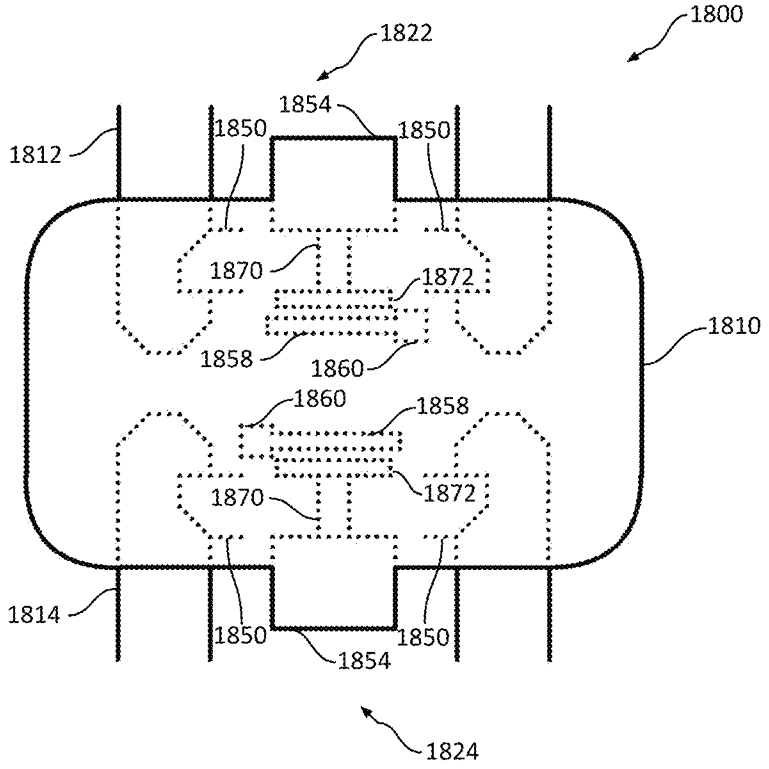
FIGS. 18A and 18B are top and side elevation views of part of a locking device according to one embodiment.
Figure 18B:
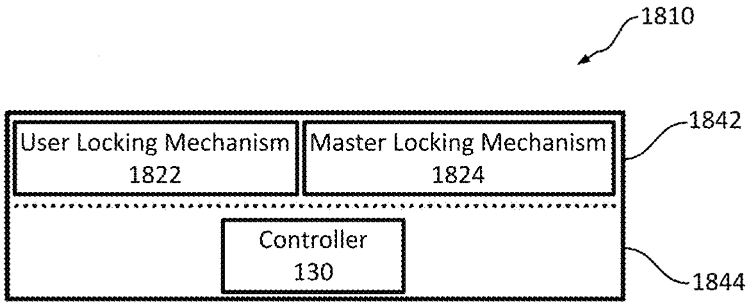

FIGS. 18A and 18B are top and side elevation views of part of a locking device 1800 according to one embodiment. As shown, the locking device 1800 may include various elements disclosed above, assembled in a manner that permits a user loop 1812 and a master loop 1814 to both be coupled to a hub 1810, with a controller 130 that provides electrical control over the locking and unlocking functionality of the device 1800.

Specifically, as shown in FIG. 18A, the locking device 1800 may have a user locking mechanism 1822 that controls locking and unlocking of the user loop 1812, and a master locking mechanism 1824 that controls locking and unlocking of the master loop 1814. Each of the user locking mechanism 1822 and the master locking mechanism 1824 may have a pair of pins 1850 that can translate and/or rotate (as disclosed in various embodiments above) between locked and unlocked positions to retain or unlock the user loop 1812 and the master loop 1814, respectively. In at least one embodiment, the master loop 1814 may have hollow ends so that the user loop 1812 can extend inside the master loop, or vice versa. Such an arrangement may reduce the overall size of the device 1800, and may therefore be useful in space-constrained locking situations.

Each of the user locking mechanism 1822 and the master locking mechanism 1824 may also have a button 1854 that can be user-actuated (i.e., pressed) by a user to move the pins 1850 to the unlocked configuration. Further, each may have a block 1858 that can be electrically actuated between locked and unlocked positions by a solenoid 1860. In various embodiments, each of the user locking mechanism 1822 and the master locking mechanism 1824 may be independently controlled, or they can be opened simultaneously with a single action.

In the locked positions, each block 1858 may interfere with actuation of the button 1854 associated with it, thereby keeping the pins 1850 from releasing the user loop 1812 or the master loop 1814. Each may further have a shaft 1870 and a plate 1872 that operatively connect the button 1854 to the block 1858 and the pins 1850. These may function as set forth in any of the embodiments described previously.

As shown in FIG. 18B, the hub 1810 may be bifurcated, with a first component 1842 and a second component 1844. The first component 1842 may generally house the mechanical components, such as the user locking mechanism 1822 and the master locking mechanism 1824 shown in FIG. 18A. The second component may generally house electrical components, such as the controller 130. The solenoids 1860 may be located in either the first component 1842 or the second component 1844. The first component 1842 and the second component 1844 may be in fixed locations relative to each other, or may be movable and/or separable relative to each other.

Figure 19A:
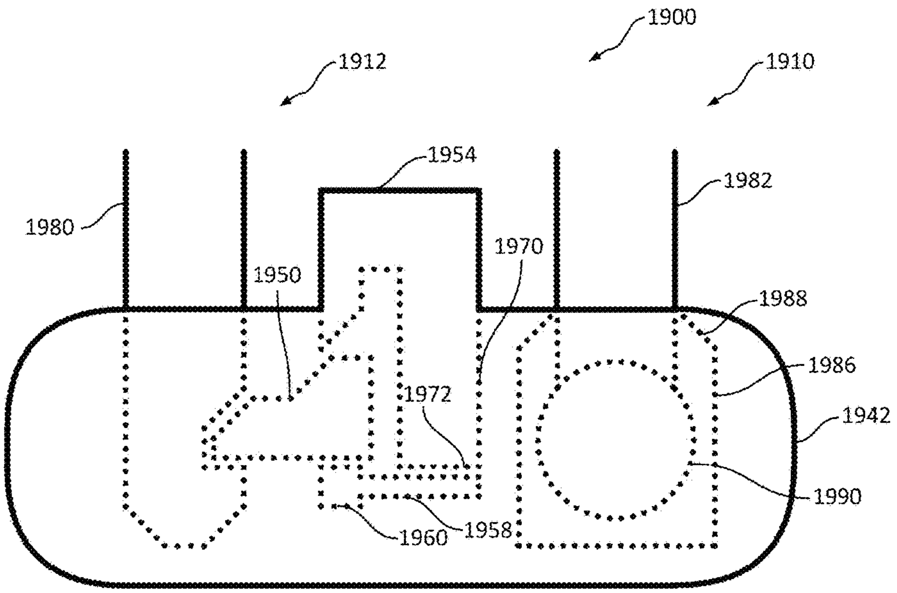
FIGS. 19A, 19B, and 19C are top, front elevation, and side elevation views, respectively, of part of a locking device according to one embodiment.
Figure 19B:
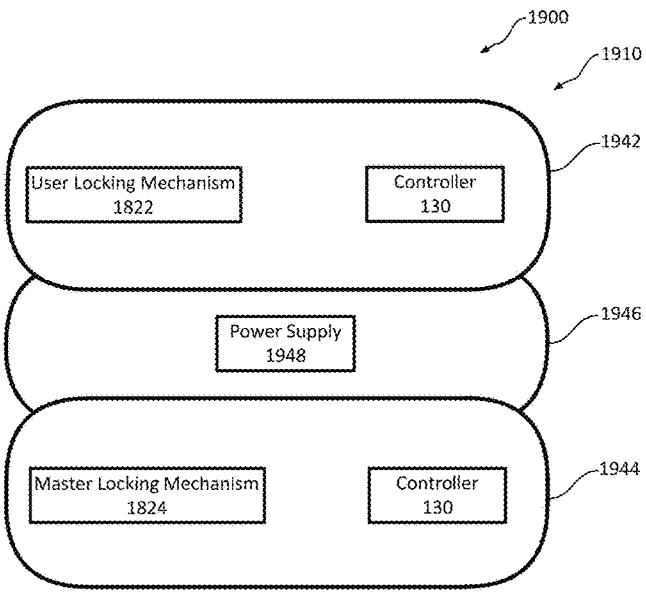
Figure 19C:
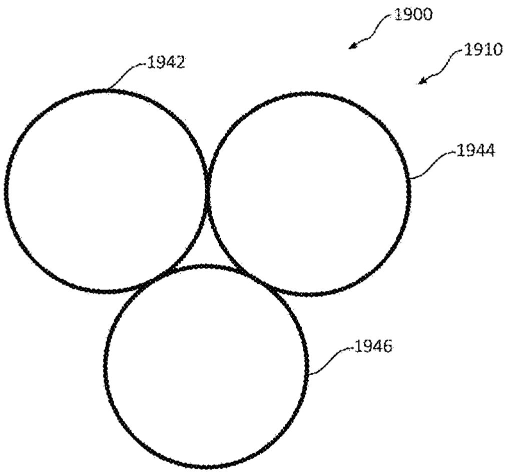

FIGS. 19A, 19B, and 19C are top, front elevation, and side elevation views, respectively, of part of a locking device 1900 according to one embodiment. The locking device 1900 may have a modular construction that provides advantages for manufacturing, maintenance, and/or use.

The locking device 1900 may include various elements disclosed above, such as a user loop 1912, a master loop (not shown), and a hub 1910, with a controller 130 that provides electrical control over the locking and unlocking functionality.

The hub 1910 may be bifurcated, as shown in FIGS. 19B and 19C, with a first component 1942 that houses a user locking mechanism 1822 and controller 130, a second component 1944 that houses a master locking mechanism 1824 and optionally, another controller 130, and a third component 1946 that houses a power supply 1948 (such as a battery). Each of the first component 1942, the second component 1944, and the third component 1946 may optionally be cylindrical in shape. The first component 1942, the second component 1944, and the third component 1946 may be arranged in-line as shown in FIG. 19B, or in a more compact, triangular array as shown in FIG. 19C. In at least one embodiment, the third component 1946 (containing the power supply 1948) may be locked to the other two components 1942, 1944, and may be unlocked by the master with a special unlock code or unlock key. This arrangement allows the power supply 1948 to be removed (for example if the power supply 1948 is a battery that has been depleted), and replaced with a fully charged one, and locked back in place.

As shown in FIG. 19A, the user locking mechanism 1922 may be located in the first component 1942 and may control locking and unlocking of the user loop 1912. The user locking mechanism 1922 may have a pin 1950 that can translate and/or rotate (as disclosed in various embodiments above) between locked and unlocked positions to retain or unlock the user loop 1912. The user locking mechanism 1922 may further have a button 1954, a block 1958, a solenoid 1960, a shaft 1970, and a plate 1972, which may generally function as disclosed in previous embodiments.

The user loop 1912 may be configured differently than those of previous embodiments, in that the user loop 1912 may have a first end 1980 configured similarly to the first prong 410 of the loop 400 of FIG. 4, and a second end 1982 that is designed to remain captured in the hub 1910 when the user loop 1912 is unlocked. More specifically, the hub 1910 may have a cavity 1986 in communication with an aperture 1988 through which the second end 1982 extends.

The second end 1982 may terminate in a ball 1990 that resides within the cavity 1986, but is too large to pass through the aperture 1988. The cavity 1986 may be sized to permit the ball 1990 to slide along with the first end 1980 when the first end 1980 is unlocked, thereby permitting withdrawal of the first end 1980 from the hub 1910. Further, the aperture 1988 may optionally be large enough to permit the second end 1982 to swivel relative to the hub 1910, to permit additional flexibility in the disposition of the user loop 1912 in the unlocked configuration. This swiveling motion may have an angular limit of up to 10°, 20°, 30, 40°, 50°, 60°, or any other angle. The second end 1982 may be freely rotatable about an axis parallel to the cavity 1986.

Figure 20:
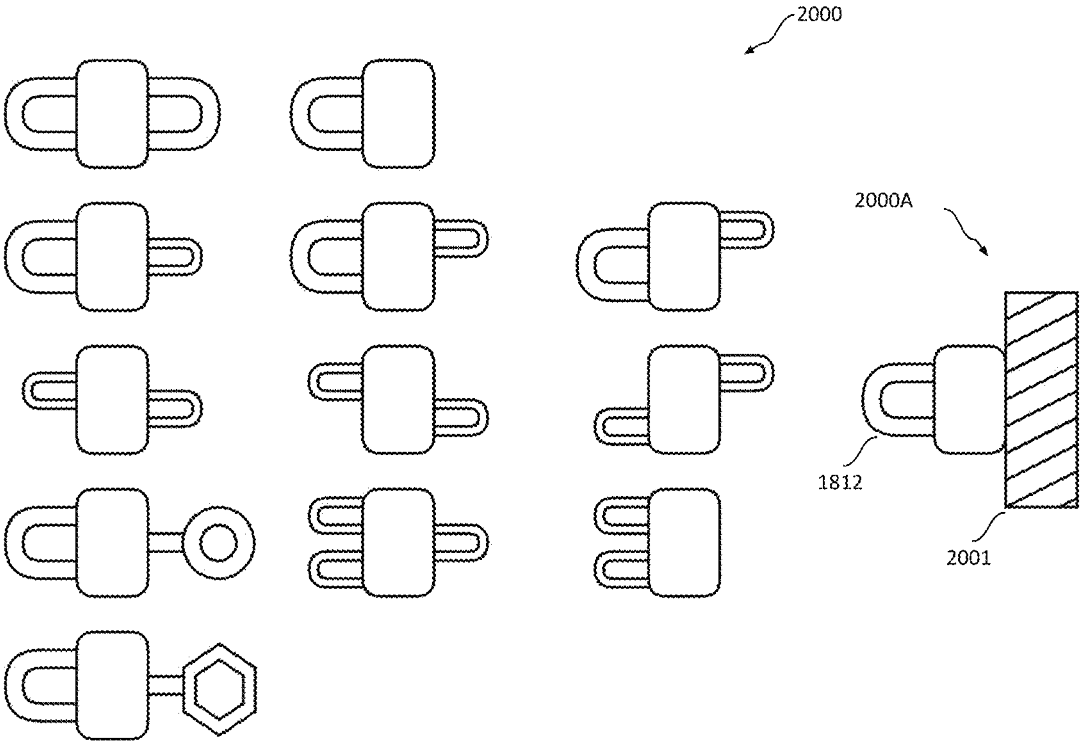
FIG. 20 is a top view of various locking devices according to some embodiments.

FIG. 20 is a top view of various locking devices 2000 according to some embodiments. As mentioned previously, the present disclosure envisions locking devices according to many different arrangements. The configuration of the user loop and the master loop (i.e., rigid, flexible, unlockable at one end, unlockable at both ends, etc.), their location relative to the hub, their location relative to each other, the number of user loops, the number of master loops, the existence of movable or stationary bifurcations in the hub, and other factors may be varied, as would be anticipated by a person of skill in the art with the aid of the present disclosure. One example 2000A depicts an arrangement wherein the hub 110 may be attached directly to a wall 2001 and may only have one loop 1812.

Figure 25A:
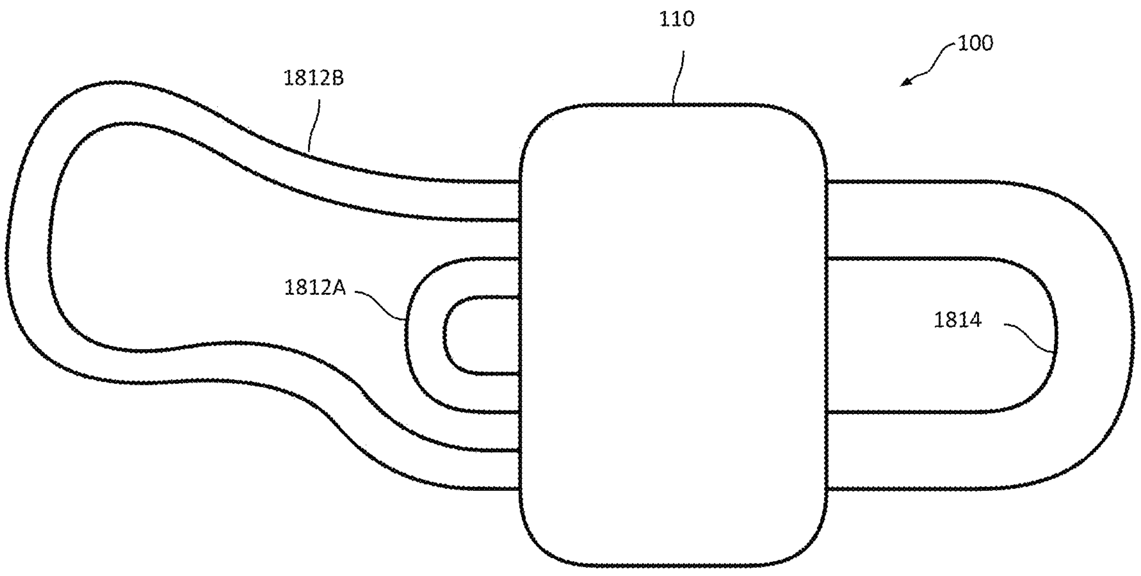
FIGS. 25A through 25C are elevation views depicting a locking device having two user loops, including an inner user loop and a larger outer user loop, according to one embodiment.
Figure 25B:
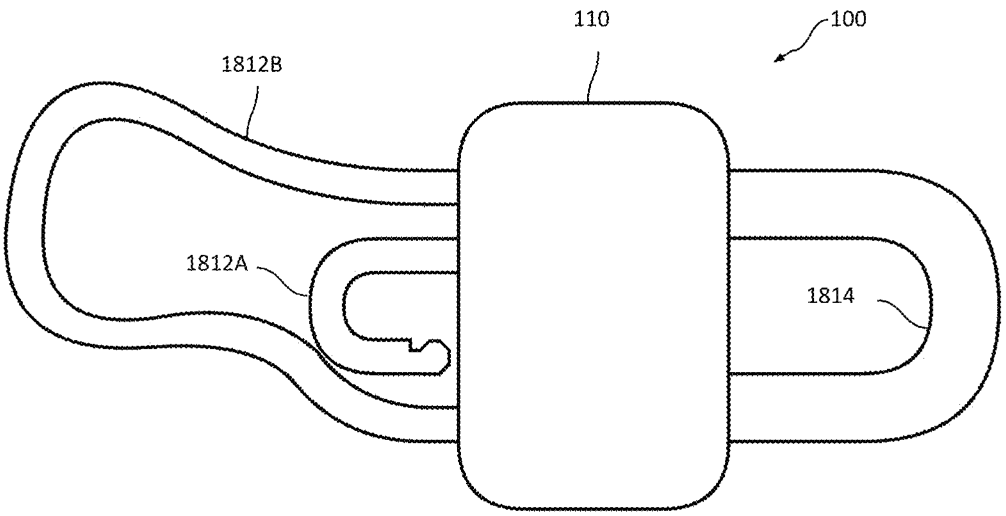
Figure 25C:
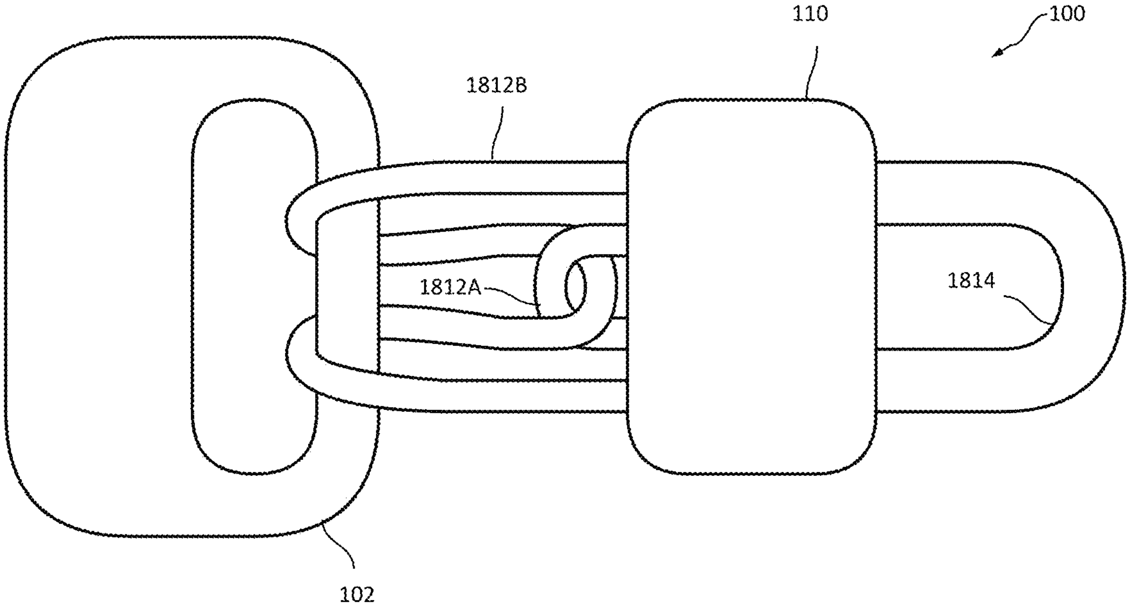

FIGS. 25A through 25C are elevation views depicting a locking device 100 having two user loops, according to one embodiment. An inner user loop 1812A may be removably secured to the hub 110, and a larger outer user loop 1812B, may be flexible and may be non-removably affixed to the hub 100 at both ends. The outer user loop 1812B may optionally be retractable into the hub 100. The master loop 1814 may be removably secured to the hub 110 as described above.

The inner user loop 1812A may be used to attach the outer user loop 1812B to the object 102 (such as a bag), as shown in FIGS. 25B and 25C. In operation, the user may unlock the inner user loop 1812A, then loop the outer user loop 1812B (which may be flexible) through the object 102 (e.g. by threading the outer user loop 1812B through a handle of a bag, as depicted in FIG. 25C), and then lock the inner user loop 1812A.

Figure 25D:
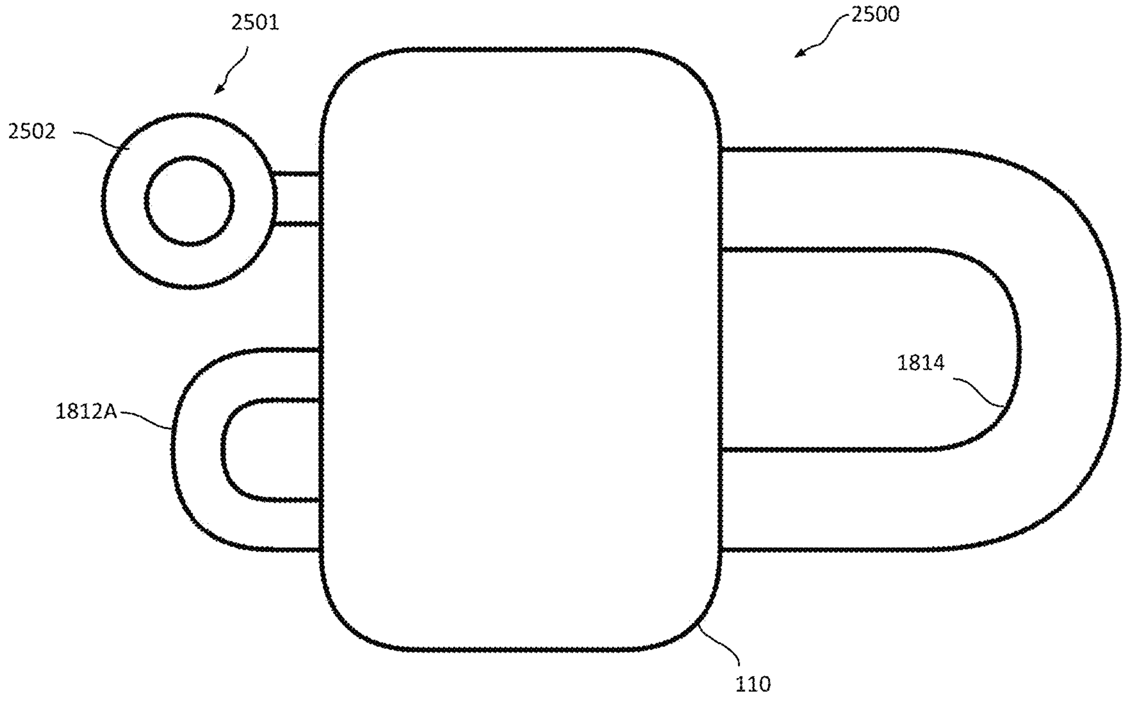
FIG. 25D is an elevation view depicting a locking device having a retractable flexible tether, according to one embodiment.

FIG. 25D is an elevation view depicting a locking device 100 having a retractable flexible tether 2501. Again, user may unlock the inner user loop 1812A, then attach the tether 2501 to the object 102 (not shown in FIG. 25D), and then lock the inner user loop 1812A. The tether 2501 may be extended and looped around/through the object 102. The circular portion 2502 of tether 2501 may then be locked using the inner user loop 1812A.

Figure 21A:
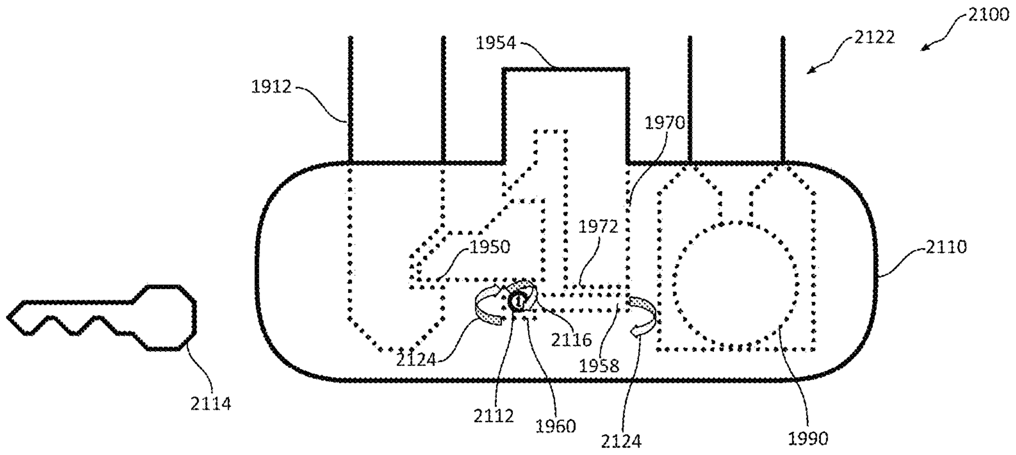
FIGS. 21A, 21B, and 21C are top, section views of locking devices with backup key operated locks, according to some embodiments.
Figure 21B:
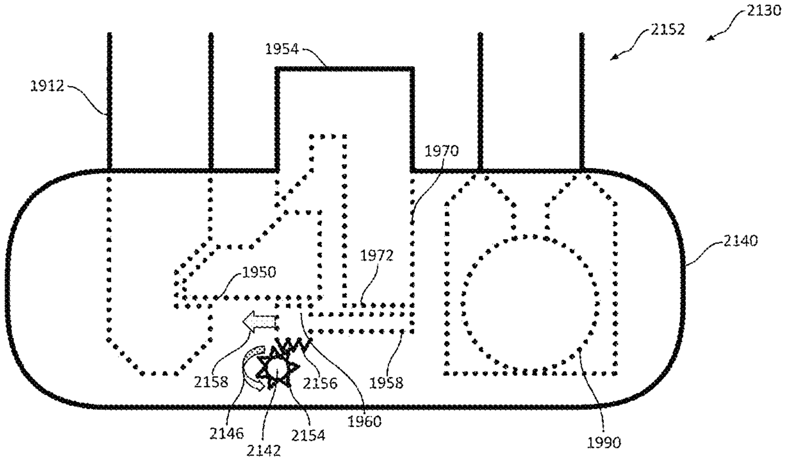
Figure 21C:
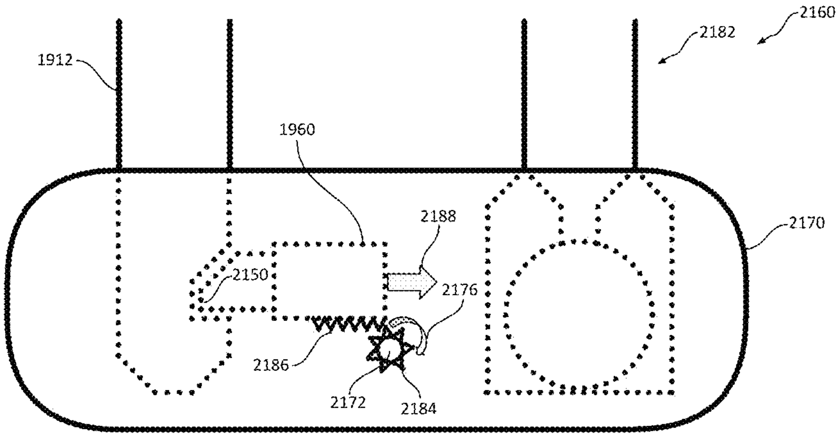

FIGS. 21A, 21B, and 21C are top, section views of a locking device 2100, a locking device 2130, and a locking device 2160 with backup key operated locks, according to some embodiments. The locking device 2100 and the locking device 2130 may be configured similarly to the locking device 1900 of FIG. 19, with the addition of the ability to use a key to unlock the user loop and/or the master loop of the device (for example, in the event of power failure or malfunction in the controller 130). Use of such a key is shown in connection with a user loop by way of example, but the features set forth herein may also be used for a master loop. In some embodiments, the user loop and the master loop may both be unlockable via the same key or different keys.

The locking device 2100 and the locking device 2130 may each include various elements disclosed above, such as a user loop 1912, a master loop (not shown), and a hub 2110, with a controller (not shown) that provides electrical control over the locking and unlocking functionality.

In FIG. 21A, the locking device 2100 may have a user locking mechanism 2122 that controls locking and unlocking of the user loop 1912 generally as set forth in the description of FIGS. 19A, 19B, and 19C. The user locking mechanism 2122 may have a pin 1950 that can translate and/or rotate (as disclosed in various embodiments above) between locked and unlocked positions to retain or unlock the user loop 1912. The user locking mechanism 2122 may further have a button 1954, a block 1958, a solenoid 1960, a shaft 1970, and a plate 1972, which may generally function as disclosed in previous embodiments. The user loop 1912 may optionally be configured as in FIG. 19A, with a ball on one end that is not released from the hub 2110 when unlocking occurs.

The user locking mechanism 2122 may have a keyhole 2112 that can be accessed through a housing of the hub 2110. The keyhole 2112 may receive a key 2114, and may be coupled to the solenoid 1960. In response to actuation of the key 2114 in the keyhole 2112 (for example, via rotation of the key 2114 along the direction indicated by the arrow 2116), the solenoid 1960 and the block 1958 may rotate, as indicated by the arrows 2124, such that the block 1958 no longer impedes motion of the button 1954. Thus, the user can use the key 2114 to perform the function of the solenoid 1960, moving the block 1958 to allow the user locking mechanism 2122 to move to the unlocked configuration via user actuation.

In FIG. 21B, the locking device 2130 may have a user locking mechanism 2152 that operates substantially as set forth above, except that the user locking mechanism 2152 may have a different key backup system.

More specifically, the user locking mechanism 2152 may have a keyhole 2142 that can be accessed through a housing of a hub 2140 of the locking device 2130. The keyhole 2142 may receive a key 2114. In response to actuation of the key 2114 in the keyhole 2142 (for example, via rotation of the key 2114 along the direction indicated by the arrow 2146), a pinion 2154 coupled to the keyhole 2142 may rotate. The pinion 2154 may have teeth that mesh with those of a rack 2156 secured to the solenoid 1960. Thus, rotation of the keyhole 2142 may cause the rack 2156, the solenoid 1960, and the block 1958 to translate in the direction shown by the arrow 2158. Thus, the block 1958 may be moved such that it no longer impedes motion of the button 1954. As in the locking device 2100 of FIG. 21A, the user can use the key 2114 to perform the function of the solenoid 1960, moving the block 1958 to allow the user locking mechanism 2152 to move to the unlocked configuration via user actuation.

In FIG. 21C, the locking device 2160 may have a user locking mechanism 2182 that operates differently from those set forth above. Specifically, the user locking mechanism 2182 may not have a button 1954, but may, instead, unlock the user loop 1912 directly through the use of the solenoid 1960, which may move a pin 2150 directly into and out of engagement with the first end 1980 of the user loop 1912.

The user locking mechanism 2182 may have a keyhole 2172 that can be accessed through a housing of a hub 2170 of the locking device 2130. The keyhole 2172 may receive a key 2114. In response to actuation of the key 2114 in the keyhole 2172 (for example, via rotation of the key 2114 along the direction indicated by the arrow 2176), a pinion 2184 coupled to the keyhole 2172 may rotate. The pinion 2184 may have teeth that mesh with those of a rack 2186 secured to the solenoid 1960. Thus, rotation of the keyhole 2172 may cause the rack 2186, the solenoid 1960, and the block 1958 to translate in the direction shown by the arrow 2188. Thus, the pin 2150 may be withdrawn from the first prong 410 of the user loop 1912, thus moving the user locking mechanism 2182 to the unlocked configuration without requiring the solenoid 1960 to operate.

Figure 22A:
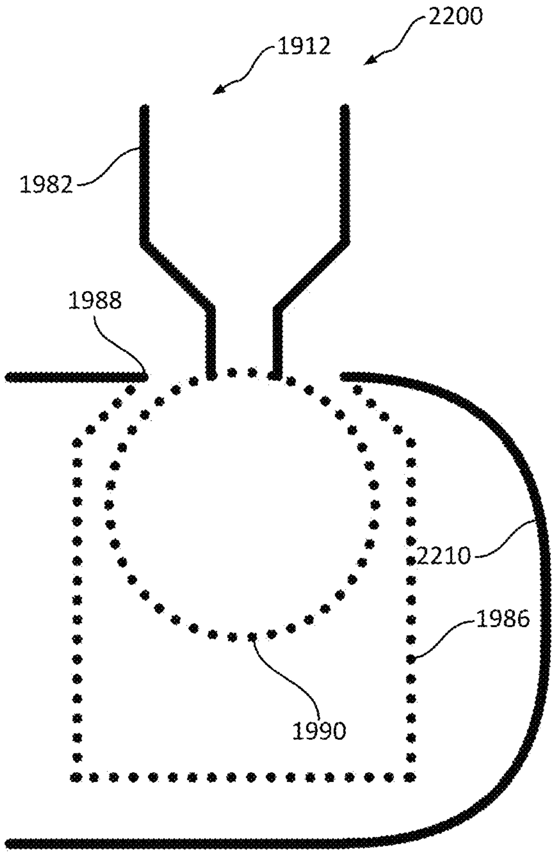
FIGS. 22A and 22B are top, section views showing part of a locking device with a ball joint according to one embodiment.
Figure 22B:
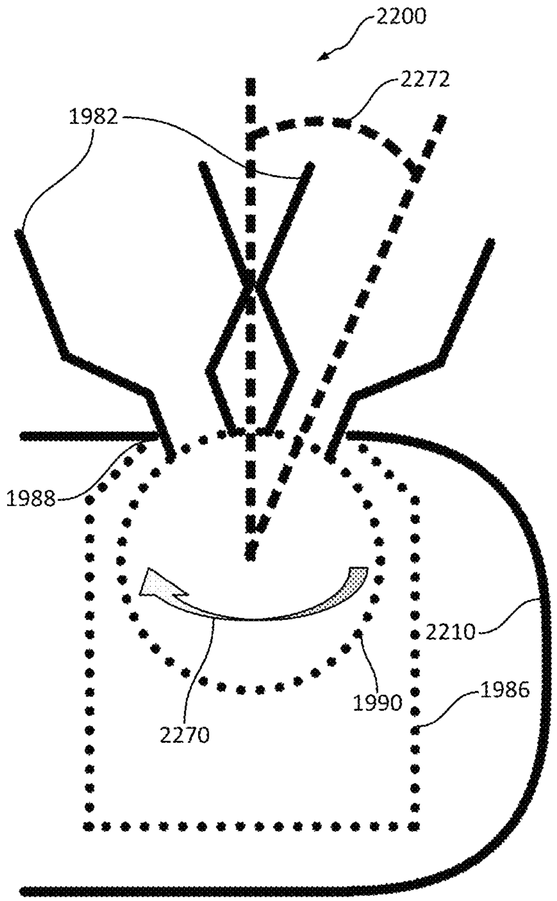

FIGS. 22A and 22B are top, section views showing part of a locking device 2200 with a ball joint according to one embodiment. The ball joint of the locking device 2200 may be substantially the same as that of the locking device 1900 of FIGS. 19A, 19B, and 19C, and may function as set forth in the description of FIG. 19A.

As shown in FIG. 22B, in the unlocked configuration, the ball joint may enable the second end 1982 to rotate freely about an axis parallel to the cavity 1986, as shown by the arrow 2270. The swiveling motion of the second end 1982 is also illustrated, with angulation up to an angle 2272, which may be selected to enable the user to position and maneuver the first prong 410 of the user loop 1912 as desired to facilitate locking and/or unlocking.

Figure 23:
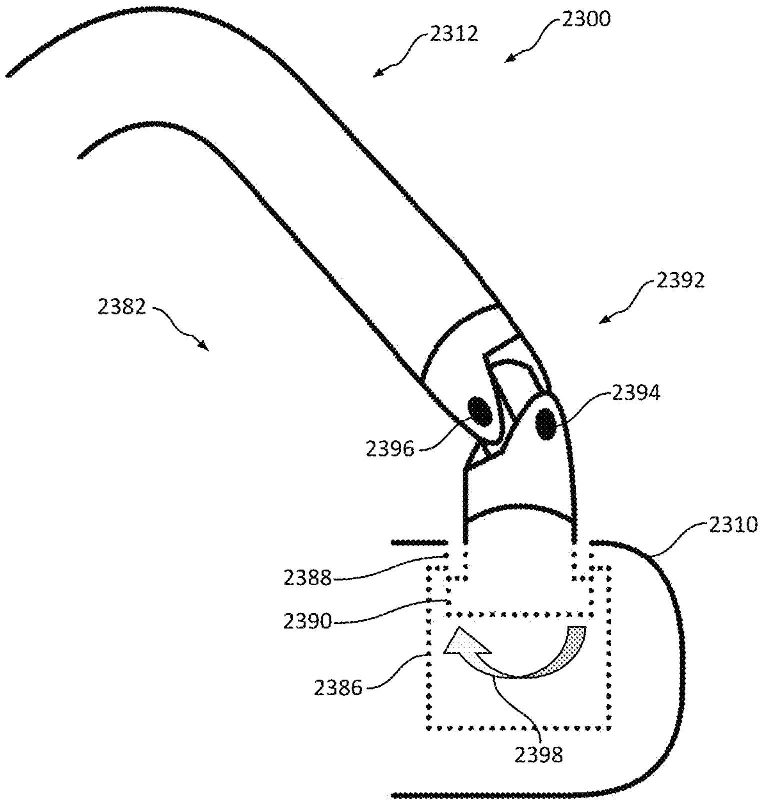
FIG. 23 is a top, section view showing part of a locking device with a swivel joint according to one embodiment.

FIG. 23 is a top, section view showing part of a locking device 2300 with a swivel joint according to one embodiment. As shown, the swivel joint may be on a second end 2382 of a user loop 2312, or in alternative embodiments, a master loop. The user loop 2312 may be configured differently than those of previous embodiments, in that the user loop 2312 may have a first end (not shown) configured similarly to the first prong 410 of the loop 400 of FIG. 4, and a second end 2382 that is designed to remain captured in the hub 2310 when the user loop 2312 is unlocked. More specifically, the hub 2310 may have a cavity 2386 in communication with an aperture 2388 through which the second end 1982 extends.

The second end 2382 may terminate in a flange 2390 that resides within the cavity 2386, but is too large to pass through the aperture 2388. The cavity 2386 may be sized to permit the flange 2390 to slide along with the first end of the user loop 2312 when the first end is unlocked, thereby permitting withdrawal of the first end from the hub 2310. Further, the second end 2382 may have a swivel joint 2392 that permits the remainder of the user loop 2312 to rotate polyaxially relative to the flange 2390. The swivel joint 2392 may have a first pin joint 2394 and a second pin joint 2396 that facilitate this multi-axial angulation. In alternative embodiments, a swivel joint with a single pin joint (not shown) may be provided, and may rely on rotation of the flange 2390 within the cavity 2386, as indicated by the arrow 2398, for rotation about a secondary axis.

Figure 24:
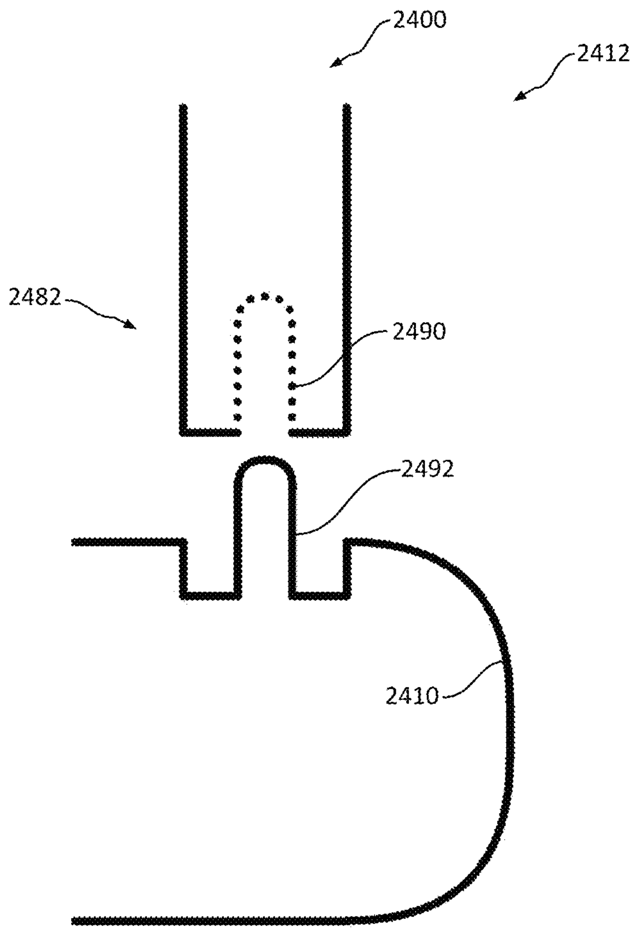
FIG. 24 is a top, section view showing part of a locking device with pin-and-hole engagement according to one embodiment.

FIG. 24 is a top, section view showing part of a locking device 2400 with pin-and-hole engagement according to one embodiment. The locking device 2400 may have a hub 2410 and a user loop 2412, for example, with a first prong 410 similar to that of the loop 400 of FIG. 4, and a second end 2482 that is designed to be freely removable from the hub 2410 as the first prong 410 is withdrawn. In the locked configuration, the second end 2482 may be docked to and retained by the hub 2410 through the use of a hole 2490 in the second end 2482, which may be receive a pin 2492 extending from the hub 2410. The engagement of the pin 2492 within the hole 2490 may secure the second end 2482 to the hub 2410 in the locked configuration, while only requiring the first prong 410 to be locked by the associated locking mechanism (not shown). The entirety of the user loop 2412 may be removable from the hub 2410 in the unlocked configuration.

The embodiments set forth above are merely exemplary; many variations would be envisioned by a person of skill in the art with the aid of the present disclosure. Features of different embodiments set forth above may be combined to generate additional embodiments that are not specifically described herein, but are nonetheless within the scope of the present disclosure.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A device for locking a first movable object to a second stationary object, the device comprising:

a hub;

a first loop configured to pass around at least part of the first movable object;

a second loop configured to pass around at least part of the second stationary object;

a first locking mechanism that is movable between:

a first locked configuration in which a first loop is secured to the hub, thereby locking the first movable object; and a first unlocked configuration in which the first loop is not secured to the hub, thereby unlocking the first movable object; and a second locking mechanism that is movable between:

a second locked configuration in which a second loop is secured to the hub, thereby locking the second stationary object; and a second unlocked configuration in which the second loop is not secured to the hub, thereby unlocking the second stationary object;

wherein the first and second locking mechanisms are fused together to form an integrated assembly; and wherein the first and second locking mechanisms operate independently of each other in moving between their respective locked configurations and unlocked configurations, such that:

a) the first locking mechanism can move between the first locked configuration and the first unlocked configuration in response to a first access control input from a user of the first mobile object separately and independently of:

b) the second locking mechanism moving between the second locked configuration and the second unlocked configuration in response to a second access control input from an entity in charge of the second stationary object.

2. The device of claim 1, further comprising at least one additional loop configured to pass around at least one additional part of the first movable object or around at least one additional movable object;

wherein:

in the first locked configuration, at least one additional loop is secured to the hub; and in the first unlocked configuration, the additional loop is not secured to the hub.

3. The device of claim 1, wherein the hub comprises:

a first component that houses the first locking mechanism; and a second component that houses the second locking mechanism;

and wherein the first component and the second component are rotatable relative to each other.

4. The locking device of claim 1, wherein the first loop is locked to the hub in the first locked configuration and remains permanently attached to the hub in the first unlocked configuration, while still allowing for the loop to pass around at least part of the stationary object or the movable object.

5. The device of claim 1, wherein one end of the first loop is polyaxially rotatably coupled to the hub.

6. The device of claim 1, further comprising a theft detection mechanism that detects whether the first loop is damaged.

7. The device of claim 1, wherein the first locking mechanism comprises a biasing element that biases the first locking mechanism to the first locked configuration.

8. The device of claim 1, wherein the first locking mechanism comprises a mechanical input that can be actuated by a user to move the first locking mechanism from the first locked configuration to the first unlocked configuration.

9. The device of claim 8, wherein the first locking mechanism further comprises a pin that slides or rotates to:

engage the first loop in the first locked configuration; and disengage the first loop in the first unlocked configuration.

10. The device of claim 8, further comprising:

a controller; and an electrically operated actuator controlled by the controller such that the electrically operated actuator is operable to help move the first locking mechanism between the first locked configuration and the first unlocked configuration.

11. The device of claim 10, wherein the first locking mechanism further comprises a block that is movable by the electrically operated actuator between:

a locked position in which the block interferes with user actuation of the mechanical input; and an unlocked position in which the block does not interfere with user actuation of the mechanical input.

12. The device of claim 11, wherein the first locking mechanism further comprising a key operated lock configured to move the block to the unlocked position without requiring actuation of the electrically operated actuator.

13. The device of claim 1, further comprising: a controller; and an electrically operated actuator controlled by the controller such that the electrically operated actuator is operable to help move the first locking mechanism between the first locked configuration and the first unlocked configuration.

14. The device of claim 1, further comprising a controller configured to perform at least one action selected from the group consisting of:

initiating motion of the first locking mechanism to the first locked configuration;

initiating motion of the first locking mechanism to the first unlocked configuration;

enabling motion of the first locking mechanism to the first locked configuration;

enabling motion of the first locking mechanism to the first unlocked configuration;

identifying a user attempting to use the locking device; and indicating a status of the device.

15. The device of claim 14, wherein the controller is configured to take the action in response to receipt of communication from a mobile device operated by a user.

16. The device of claim 1;

wherein the first locking mechanism comprises:

a block that is movable between a locked position and an unlocked position; and a mechanical input configured such that:

with the block in the unlocked position, the mechanical input can be actuated by a user to move the first locking mechanism from the first locked configuration to the first unlocked configuration; and with the block in the locked position, the mechanical input cannot be actuated by a user to move the first locking mechanism from the first locked configuration to the first unlocked configuration.

17. The device of claim 1, further comprising:

a second loop configured to pass around at least part of the stationary object; and a second locking mechanism that is movable between:

a second locked configuration in which the second loop is secured to the hub; and a second unlocked configuration in which the second loop is not secured to the hub.

18. The device of claim 16, further comprising:

a controller; and an electrically operated actuator controlled by the controller such that the electrically operated actuator is operable to move the block between the locked position and the unlocked position.

19. The device of claim 18, wherein the first locking mechanism further comprising a key operated lock configured to move the block to the unlocked position without requiring actuation of the electrically operated actuator.

* * * * *